United States Patent
Pyo et al.

(10) Patent No.: US 12,222,765 B2
(45) Date of Patent: Feb. 11, 2025

(54) DISPLAY DEVICE

(71) Applicant: LG ELECTRONICS INC., Seoul (KR)

(72) Inventors: Jonggil Pyo, Seoul (KR); Kwaneun Jin, Seoul (KR); Jaeyong Kim, Seoul (KR); Jingyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 17/799,515

(22) PCT Filed: Feb. 13, 2020

(86) PCT No.: PCT/KR2020/002004
§ 371 (c)(1),
(2) Date: Aug. 12, 2022

(87) PCT Pub. No.: WO2021/162143
PCT Pub. Date: Aug. 19, 2021

(65) Prior Publication Data
US 2023/0073974 A1 Mar. 9, 2023

(51) Int. Cl.
*G06F 1/16* (2006.01)
(52) U.S. Cl.
CPC .......... *G06F 1/1652* (2013.01); *G06F 1/1656* (2013.01); *G06F 1/1684* (2013.01)
(58) Field of Classification Search
None
See application file for complete search history.

(56) References Cited

U.S. PATENT DOCUMENTS

| | | | |
|---|---|---|---|
| 11,282,415 B2* | 3/2022 | Kay | E01F 13/028 |
| 11,493,952 B2* | 11/2022 | Mehandjiysky | G06F 1/1686 |
| 2012/0204453 A1* | 8/2012 | Jung | G09F 9/301 |
| | | | 40/517 |
| 2014/0268532 A1* | 9/2014 | Nicol | G09F 15/0062 |
| | | | 361/749 |
| 2018/0103552 A1* | 4/2018 | Seo | H05K 5/0017 |
| 2020/0013317 A1* | 1/2020 | Cho | H05K 5/0217 |

FOREIGN PATENT DOCUMENTS

| | | |
|---|---|---|
| KR | 10-2016-0081786 | 7/2016 |
| KR | 10-2016-0129669 | 11/2016 |
| KR | 10-2017-0136060 | 12/2017 |
| KR | 10-2019-0036978 | 4/2019 |
| KR | 10-2020-0004003 | 1/2020 |

OTHER PUBLICATIONS

PCT International Application No. PCT/KR2020/002004, International Search Report dated Oct. 29, 2020, 5 pages.

* cited by examiner

*Primary Examiner* — Xanthia C Relford
*Assistant Examiner* — Xanthia C Cunningham
(74) *Attorney, Agent, or Firm* — LEE, HONG, DEGERMAN, KANG & WAIMEY

(57) ABSTRACT

Disclosed is a display device. The display device of the present disclosure comprises: a flexible display panel; an elongated roller on which the display panel is wound or unwound; and a disk wheel positioned adjacent to the edges of the display panel which is laminated while wound on the roller, wherein the disk wheel is coupled to the roller and passes across the axis of rotation of the roller. The diameter of the disk wheel may be larger than the diameter of the display panel wound around the roller.

15 Claims, 39 Drawing Sheets

DISPLAY DEVICE

CROSS-REFERENCE TO RELATED APPLICATIONS

This application is the National Stage filing under 35 U.S.C. 371 of International Application No. PCT/KR2020/002004, filed on Feb. 13, 2020, the contents of which are hereby incorporated by reference herein its entirety.

TECHNICAL FIELD

The present disclosure relates to a display device.

BACKGROUND ART

As the information society develops, the demand for display devices is also increasing in various forms. In response to this, various display devices such as Liquid Crystal Display Device (LCD), Plasma Display Panel (PDP), Electroluminescent Display (ELD), and Vacuum Fluorescent Display (VFD) have been researched and used in recent years.

Among them, a display device using an organic light emitting diode (OLED) has superior luminance characteristics and viewing angle characteristics compared to a liquid crystal display device, and can be implemented in an ultra-thin shape as it does not require a backlight unit.

In addition, a flexible display panel can be bent or wound on a roller. By using the flexible display panel, it is possible to implement a display device that is roll out from a roller or wound on a roller. A lot of research has been done on a structure for winding or unwinding a flexible display panel on/from a roller.

DISCLOSURE

Technical Problem

An object of the present disclosure is to solve the above and other problems.

Another object of the present disclosure may be to secure structural rigidity to prevent sagging of a display device.

Another object of the present disclosure may be to secure structural rigidity to prevent torsion of a display device.

Another object of the present disclosure may be to provide a driving mechanism for a display device.

Technical Solution

According to an aspect of the present disclosure for achieving the above object, there is provided a display device including: a flexible display panel; a roller which extends long, and around which the display panel is wound, or from which the display panel is unwound; and a disc wheel which is located adjacent to edges of stacked display panel while being wound around the roller, crosses a rotation shaft of the roller, and is coupled to the roller, wherein a diameter of the disk wheel is larger than a diameter of the display panel wound around the roller.

Advantageous Effects

The effect of the display device according to the present disclosure will be described as follows.

According to at least one of embodiments of the present disclosure, structural rigidity for preventing the display device from sagging may be secured.

According to at least one of embodiments of the present disclosure, structural rigidity for preventing torsion of the display device may be secured.

According to at least one of embodiments of the present disclosure, a driving mechanism of the display device may be provided.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Figure 1:
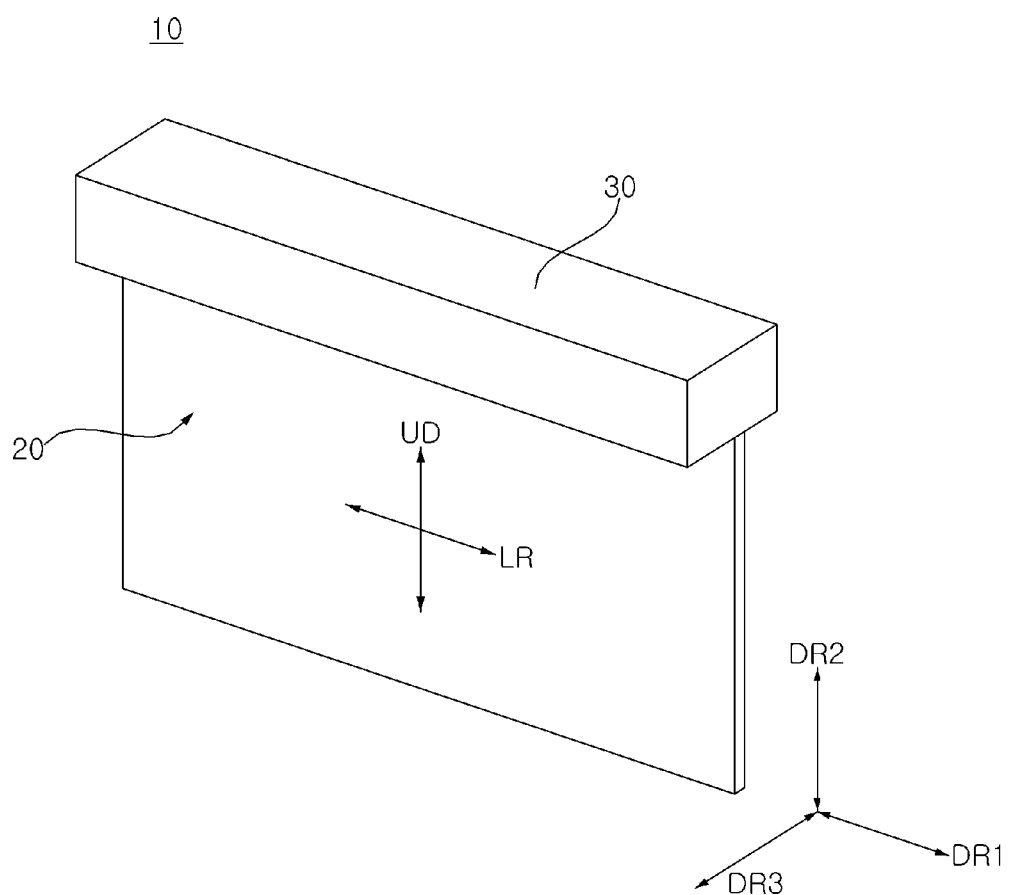
FIGS. 1 to 39 are diagrams illustrating examples of a display device according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if the embodiment is described with reference to specific drawings, if necessary, reference numerals not appearing in the specific drawings may be referred to, and reference numerals not appearing in the specific drawings are used in a case where the above reference numerals appear in the other figures.

Referring to FIG. 1, a display device 10 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

A direction parallel to the length direction of the housing 30 may be referred to as a first direction DR1, a left direction, or a right direction. A direction in which the display unit 20 displays a screen may be referred to as a front side direction, or a forward direction. A direction opposite to the direction in which the display unit 20 displays a screen may be referred to as a −z axis, a rear side direction, or a rearward direction. A direction parallel to a height direction of the display device 10 may be referred to as a second direction DR2, an upper direction, or a lower direction.

A third direction DR3 may be a direction perpendicular to the first direction DR1 and/or the second direction DR2. The first direction DR1 and the second direction DR2 may be collectively referred to as a horizontal direction. In addition, the third direction DR3 may be referred to as a vertical direction. The left-right direction LR may be parallel to the first direction DR1, and the up-down direction UD may be parallel to the second direction DR2.

Figure 2:
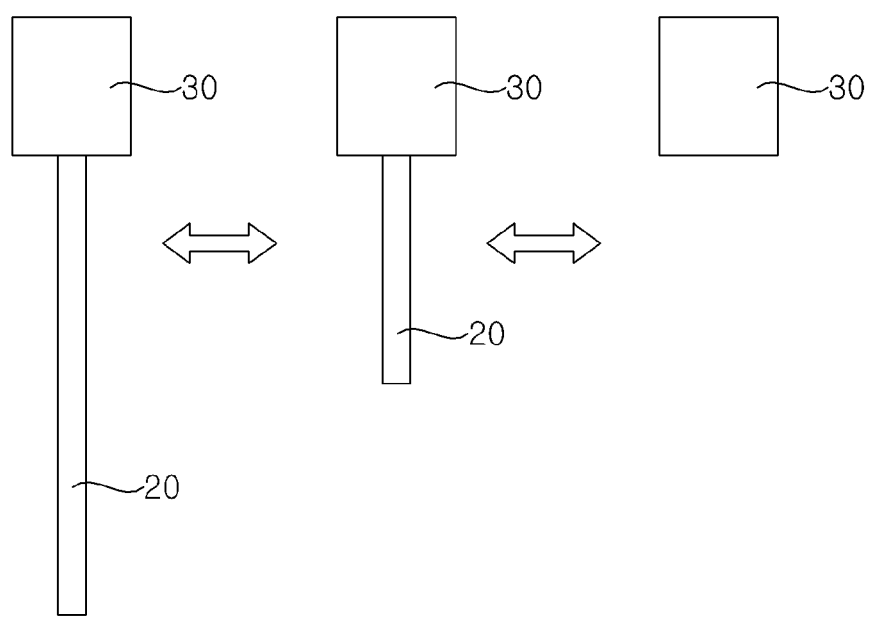

Referring to FIG. 2, the entire display unit 20 may be located inside the housing 30. At least a portion of the display unit 20 may be located outside the housing 30. The extent to which the display unit 20 is exposed to the outside of the housing 30 may be adjusted as necessary.

Figure 3:
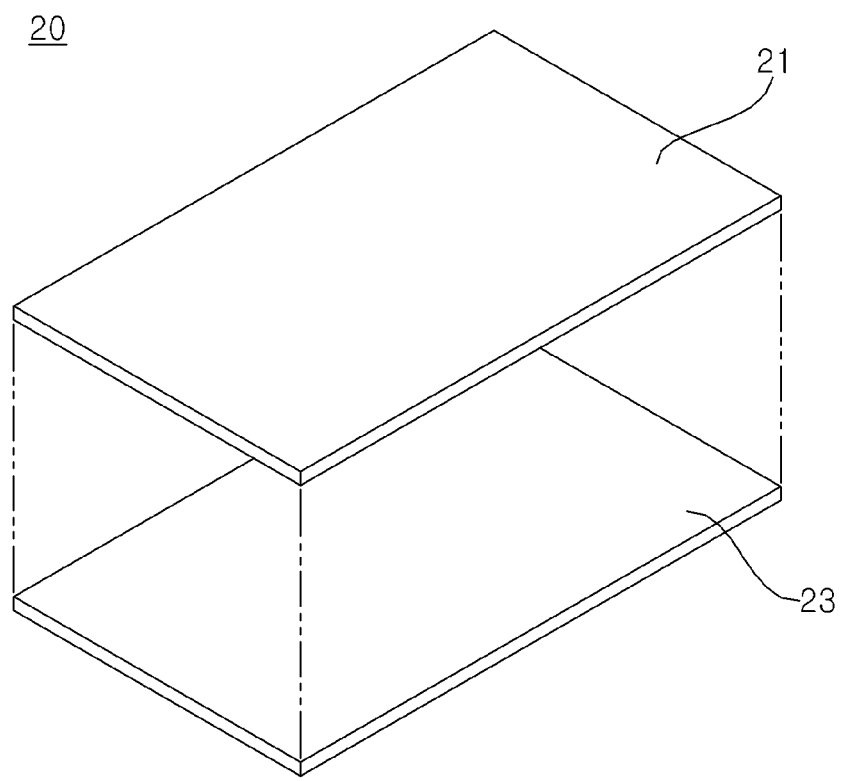

Referring to FIG. 3, the display unit 20 may include a display panel 21 and a plate 23. The display panel 21 may be flexible. For example, the display panel 21 may be an organic light emitting display (OLED).

The display panel 21 may have a front surface for displaying an image. The display panel 21 may have a rear surface opposite to the front surface. The front surface of the display panel 21 may be covered with a light-transmitting material. For example, the light-transmitting material may be a synthetic resin or a film.

The plate 23 may be coupled, fastened, or attached to the rear surface of the display panel 21. The plate 23 may include a metal material. The plate 23 may be referred to as a module cover 23, a cover 23, a display panel cover 23, a panel cover 23, or an apron 23.

Figure 4:
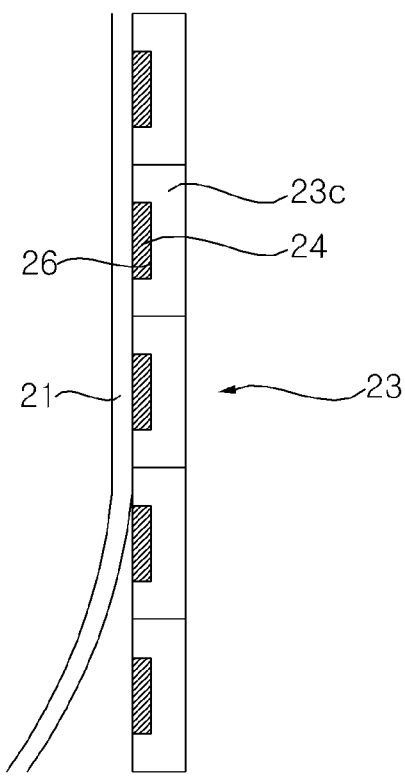

Referring to FIG. 4, the plate 23 may include a plurality of segments 23c. A magnet 24 may be located inside a recess 26 of the segment 23c. The recess 26 may be located on a surface of the segment 23c facing the display panel 21. The recess 26 may be located in the front surface of each segment 23c. Since the magnet 24 is received inside the recess 26, the magnet 24 may not protrude out of the segment 23c. The display panel 21 may be flat without being crumpled even when it comes into contact with the segment 23c.

Figure 5:
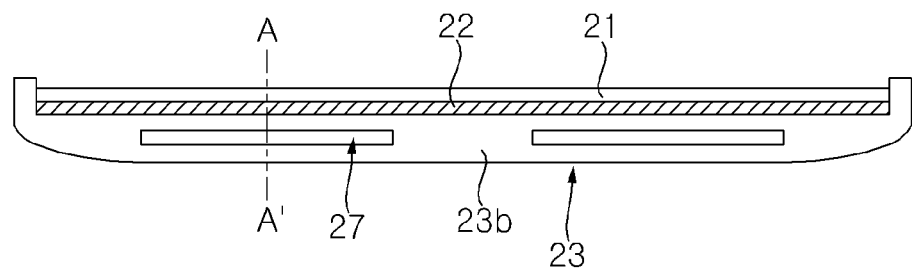
Figure 5:
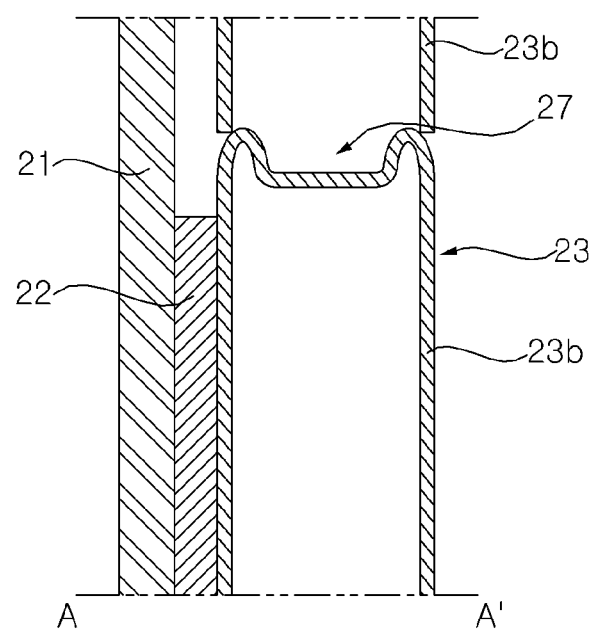

Referring to FIG. 5, a bead 27 may be formed on the upper surface of the segment 23b. The bead 27 may have a shape recessed to the inside of the segment 23b. For example, the bead 27 may be formed by pressing the segment 23b. A plurality of beads 27 may be formed in the segment 23b. The plurality of beads 27 may be spaced apart from each other. The bead 27 may improve the rigidity of the segment 23b. The bead 27 may prevent the shape of the segment 23b from being deformed from an external impact. The segment 23b may be fixed to the rearward direction of the display panel 21 by an adhesive member 22. For example, the adhesive member 22 may be a double-sided tape.

Figure 6:
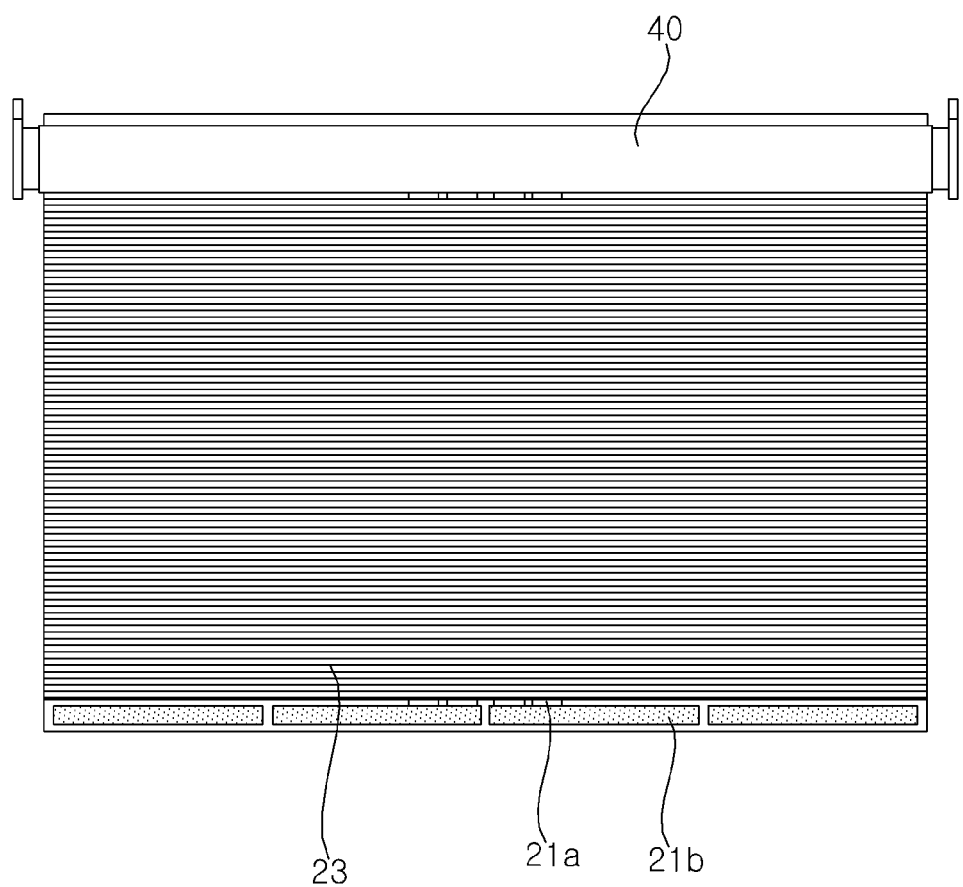

Referring to FIG. 6, a source PCB 21b may be located in the lower side of the module cover 23. When the source PCB 21b is rolled down or rolled up, its position may change with the movement of the module cover 23. A FFC cable 21a may be located in the center of the module cover 23 based on a first direction. The FFC cable 21a may be located in opposite ends of the module cover 23 based on the first direction.

Figure 7:
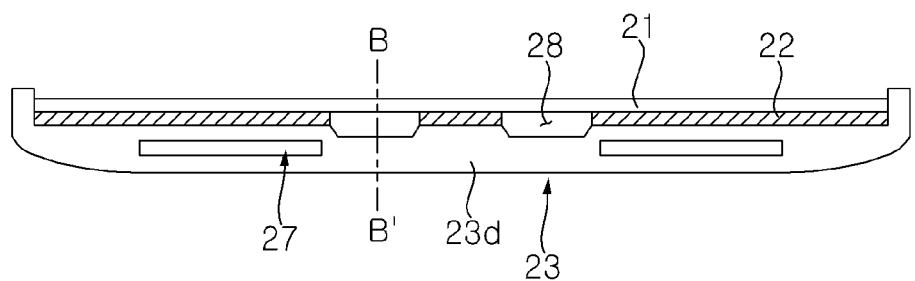
Figure 7:
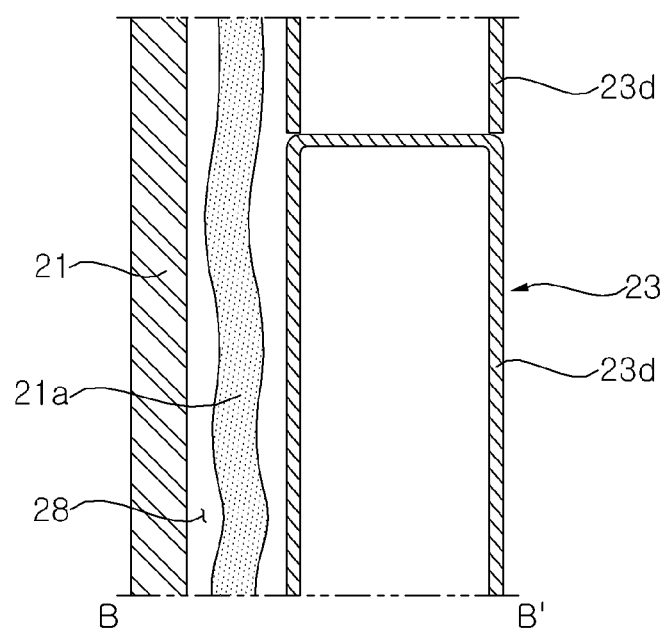

Referring to FIG. 7, the segment 23d may include a recess portion 28 recessed to the inside of the segment 23d. The recess portion 28 may form a space between the display panel 21 and the module cover 23. The FFC cable 21a may be accommodated in the space formed by the recess portion 28. In addition, the recess portion 28 may improve the rigidity of the segment 23d. The bead 27 may be located on the segment 23d excluding a portion where the recess portion 28 is located. The position of the recess portion 28 may not overlap with the position of the bead 27 to prevent the segment 23d from weakening.

Figure 8:
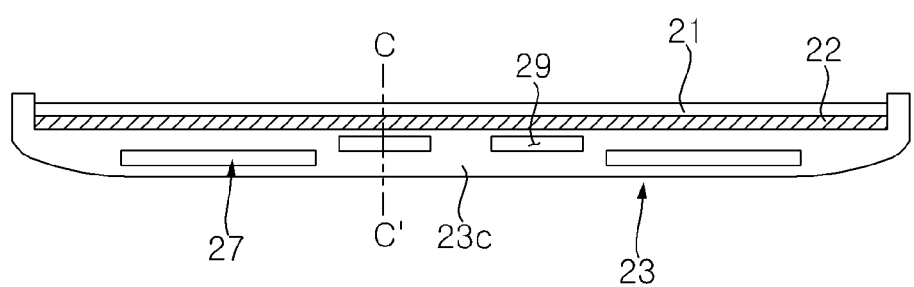
Figure 8:
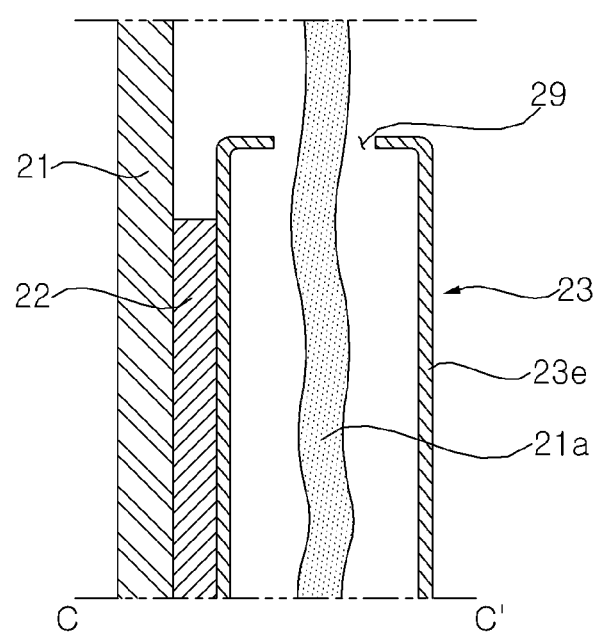

Referring to FIG. 8, in the segment 23e, a penetrating portion 29 may be located in a central portion of the segment 23e based on the first direction. The penetrating portion 29 may penetrate the central portion of the segment 23e in the second direction. That is, the penetrating portion 29 may be a hole located in the segment 23e. The penetrating portion 29 may be a portion in which the FFC cable 21a is located. Since the penetrating portion 29 is formed in the segment 23e, the thickness of the segment 23e can be reduced in comparison with a case where the FFC cable 21a is located in the recess portion 28 (refer to FIG. 7). The bead 27 may be located in the segment 23e excluding a portion where the penetrating portion 29 is located. The position of the penetrating portion 29 may not overlap the position of the bead 27 in order to prevent the segment 23e from weakening.

Figure 9:
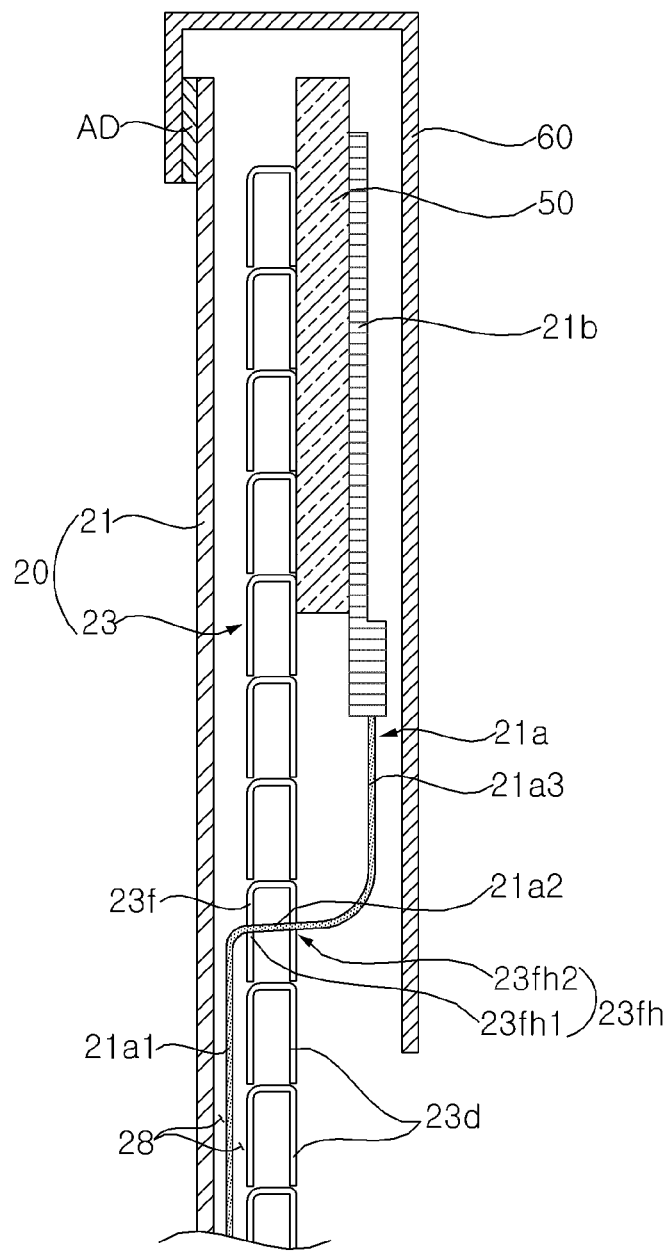

Referring to FIG. 9, a top case 60 may cover the display panel 21 and the module cover 23 as well as the source PCB 21b and an upper bar 50. One surface of the upper bar 50 may be coupled to the rear surface of the module cover 23, and the other surface may be coupled to the source PCB 21b. The upper bar 50 may be fixed to the module cover 23 to support the source PCB 21b.

Figure 10:
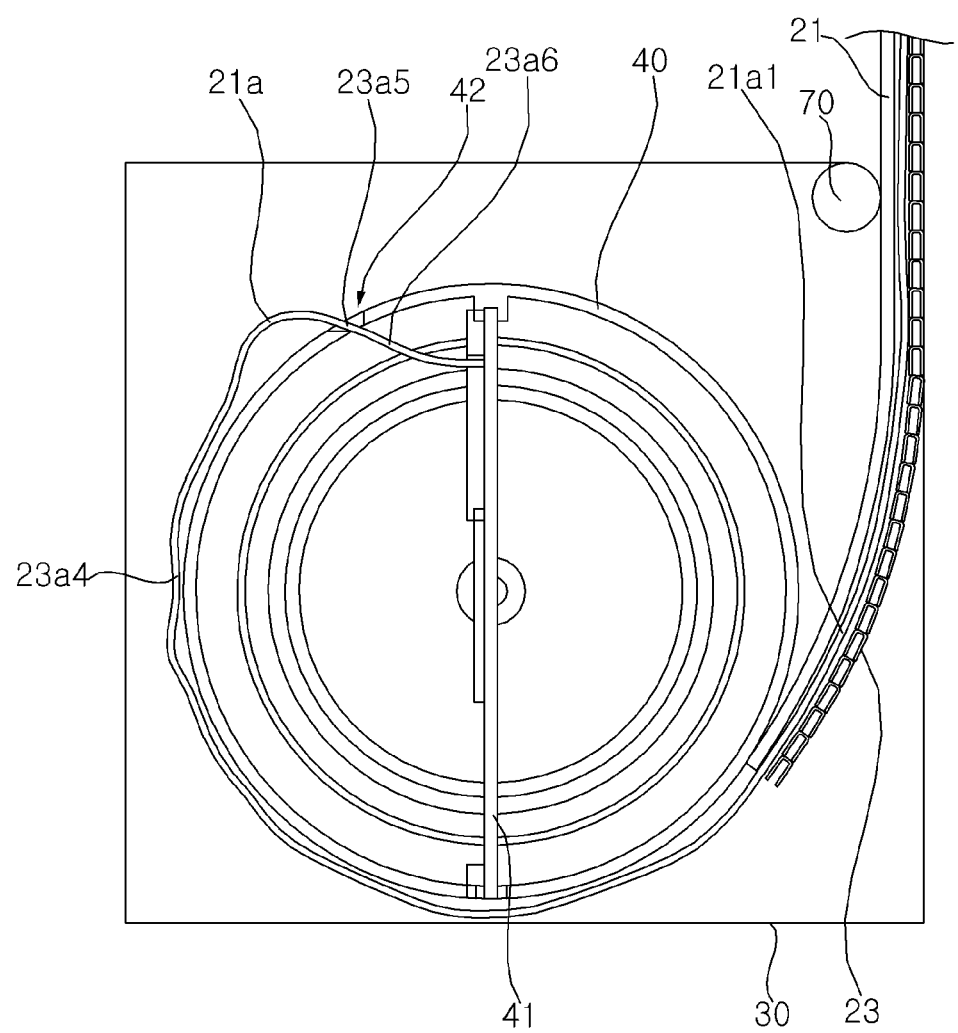

The lower end of the FFC cable 21a may be connected to a timing controller board 41 (refer to FIG. 10) inside a panel roller 40 (refer to FIG. 10). The FFC cable 21a may be wound around or unwound from the panel roller 40 together with the display unit 20.

A portion of the FFC cable 21a may be located between the display panel 21 and the module cover 23. A portion of the FFC cable 21a located between the display panel 21 and the module cover 23 may be referred to as a first portion 21a1. The first portion 21a1 may be located in the recess portion 28 formed by the plurality of segments 23d. Alternatively, the first portion 21a1 may be received in the recess portion 28 formed by the plurality of segments 23d.

A portion of the FFC cable 21a may penetrate the segment 23f. A portion of the FFC cable 21a that penetrates the segment 23f may be referred to as a second portion 21a2. The segment 23f may include a first hole 23fh1 formed on the front surface and a second hole 23fh2 formed on the rear surface. The first hole 23fh1 and the second hole 23fh2 may be interconnected to form one hole 23fh. The hole 23fh may penetrate the segment 23f in a third direction. The second portion 21a2 may pass through the hole 23fh. The hole 23fh may be referred to as a connection hole 23fh.

An upper end of the FFC cable 21a may be electrically connected to the source PCB 21b. A portion of the FFC cable 21a may be located on the rear surface of the module cover 23. A portion of the FFC cable 21a located on the rear surface of the module cover 23 may be referred to as a third portion 21a3. The third portion 21a3 may be electrically connected to the source PCB 21b.

The third portion 21a3 may be covered by the top case 60. Accordingly, the third portion 21a3 may not be exposed to the outside.

Referring to FIG. 10, the FFC cable 21a may be connected to the timing controller board 41 mounted on the panel roller 40. A through hole 42 may be formed in the panel roller 40, and the FFC cable 21a may be connected to the timing controller board 41 through the through hole 42.

The through hole 42 may be located in one side of the panel roller 40 and may penetrate the outer circumferential portion of the panel roller 40. The FFC cable 21a may be connected to one side of the timing controller board 41 through the through hole 42.

Even if the FFC cable 21a is located on the outer perimeter of the panel roller 40, the connection to the timing controller board 41 may be maintained due to the through hole 42. Accordingly, the FFC cable 21a may not be twisted by rotating together with the panel roller 40.

A portion of the FFC cable 21a may be wound around the panel roller 40. A portion of the FFC cable 21a wound around the panel roller 40 may be referred to as a fourth portion 23a4. The fourth portion 23a4 may be in contact with the circumference of the panel roller 40.

A portion of the FFC cable 21a may pass through the through hole 42. A portion of the FFC cable 21a passing through the through hole 42 may be referred to as a fifth portion 23a5.

A lower end of the FFC cable 21a may be electrically connected to the timing controller board 41. A portion of the FFC cable 21a may be located inside the panel roller 40. A portion of the FFC cable 21a located inside the panel roller 40 may be referred to as a sixth portion 23a6. The sixth portion 23a6 may be electrically connected to the timing controller board 41.

Figure 11:
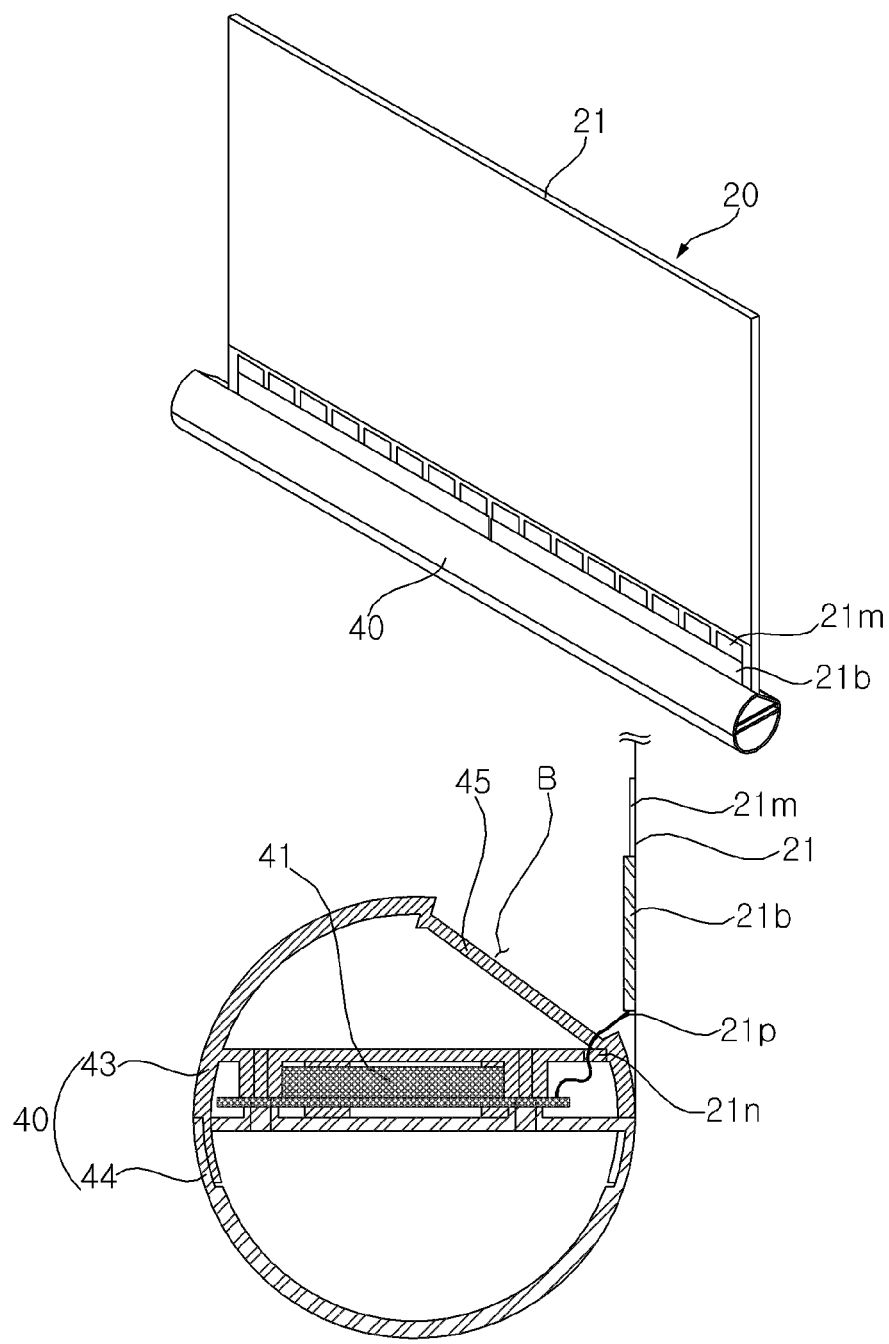

Referring to FIG. 11, the display panel 21 may be connected to the roller 40. The display panel 21 may be wound around or unwound from the roller 40. The display panel 21 may be electrically connected to the plurality of source PCBs 21b. The plurality of source PCBs 21b may be spaced apart from each other.

A source chip on film (COF) 21m may connect the display panel 21 and the source PCB 21b. The source COF 21m may be located in the lower side of the display panel 21. The roller 40 may include a first part 43 and a second part 44. The first part 43 and the second part 44 may be fastened by a screw. The timing controller board 41 may be mounted inside the roller 40.

The source PCB 21b may be electrically connected to the timing controller board 41. The timing controller board 41 may transmit digital video data and a timing control signal to the source PCB 21b.

A cable 21p may electrically connect the source PCB 21b and the timing controller board 41. For example, the cable 21p may be a flexible flat cable (FFC). The cable 21p may pass through the hole 21n. The hole 21n may be formed in a seating portion 45 or the first part 43. The cable 21p may be located between the display panel 21 and the second part 44.

The seating portion 45 may be formed in the outer perimeter of the first part 43. The seating portion 45 may be formed by stepping a portion of the outer perimeter of the first part 43. The seating portion 45 may form a space B. When the display unit 20 is wound around the panel roller 40, the source PCB 21b may be received in the seating portion 45. Since the source PCB 21b is received in the seating portion 45, it may not be bent or crooked, and durability may be improved.

Figure 12:
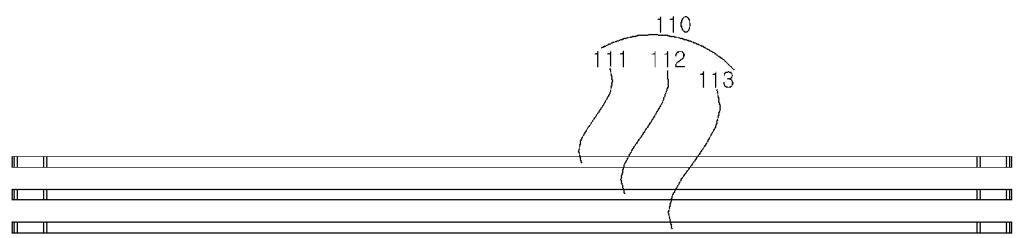
Figure 13:
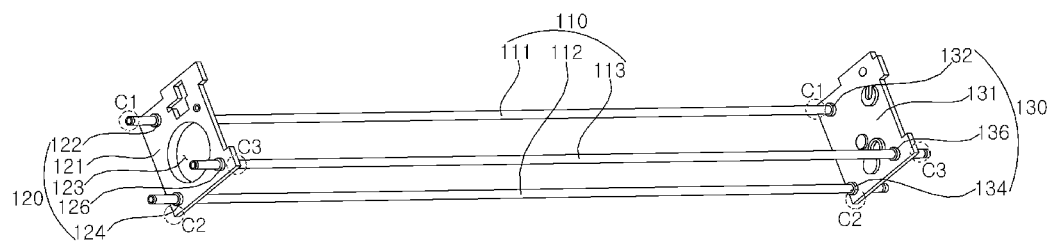

Referring to FIGS. 12 and 13, a pipe 110 may extend long in the left-right direction. There may be a plurality of pipes 110. The plurality of pipes 110 may include a first pipe 111, a second pipe 112, and a third pipe 113. The plurality of pipes 110 may be parallel to each other. For example, the pipe 110 may be a hollow cylinder. As another example, the pipe 110 may be a cylindrical bar.

The pipe 110 may be coupled to a frame 120, 130 while being inserted into the frame 120, 130. The frame 120, 130 may include a first frame 120 and a second frame 130. The first frame 120 may be located adjacent to one end of the pipes 110, and the second frame 130 may be located adjacent to the other end of the pipes 110. The first frame 120 may face the second frame 130.

For example, the frame 120, 130 may be a rectangular plate. The first pipe 111 may be inserted into the frames 120 and 130 while being adjacent to a first corner C1 of the first frame 120 and the second frame 130. The second pipe 112 may be inserted into the frames 120 and 130 while being adjacent to a second corner C2 of the first frame 120 and the second frame 130. The third pipe 113 may be inserted into the frames 120 and 130 while being adjacent to a third corner C3 of the first frame 120 and the second frame 130.

A central opening 123 may be formed in a plate 121 of the first frame 120. The central opening 123 may be a circle formed by penetrating the plate 121 of the first frame 120. The first pipe 111, the second pipe 112, and the third pipe 113 may be disposed while forming a triangle with respect to the central opening 123.

Referring to FIG. 13, couplers 122, 124, 126, 132, 134, and 136 may be formed in the plates 121 and 131. The first frame 120 may include a 11 coupler 122, a 12 coupler 124, and a 13 coupler 126 formed in the plate 121. The second frame 130 may include a 21 coupler 132, a 22 coupler 134, and a 23 coupler 136 formed in the plate 131. The first pipe 111 may be inserted into the 11 coupler 122 and the 21 coupler 132. The second pipe 112 may be inserted into the 12 coupler 124 and the 22 coupler 134. The third pipe 113 may be inserted into the 13 coupler 126 and the 23 coupler 136.

Figure 14:
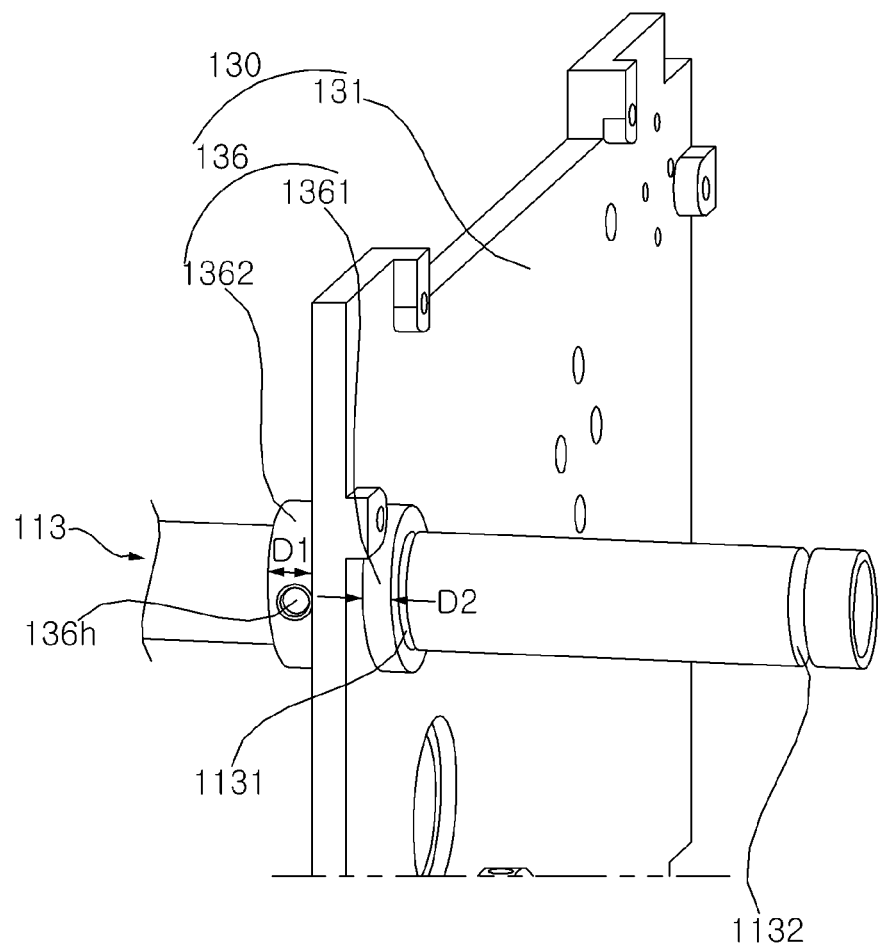
Figure 15:
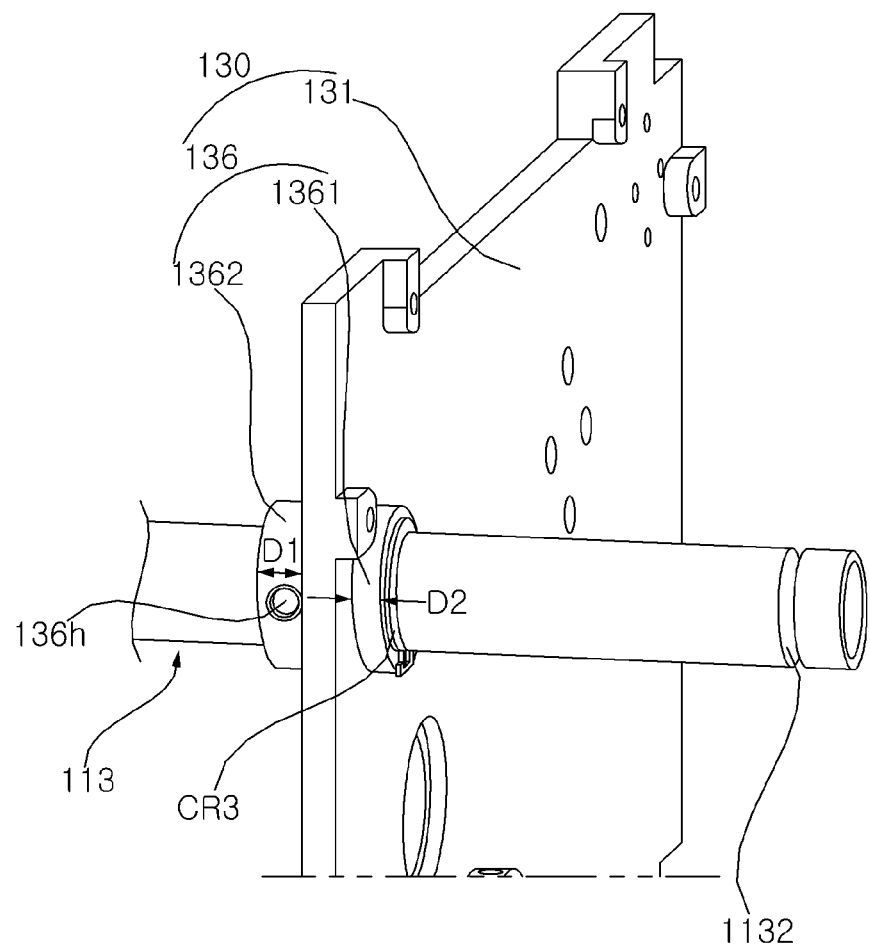
Figure 16:
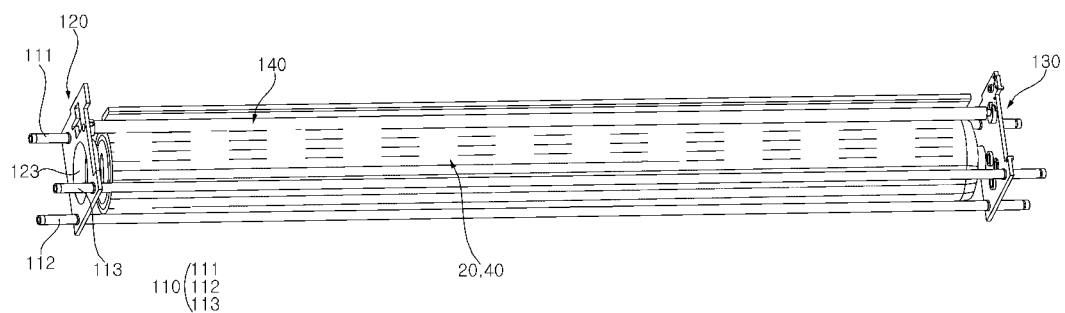
Figure 17:
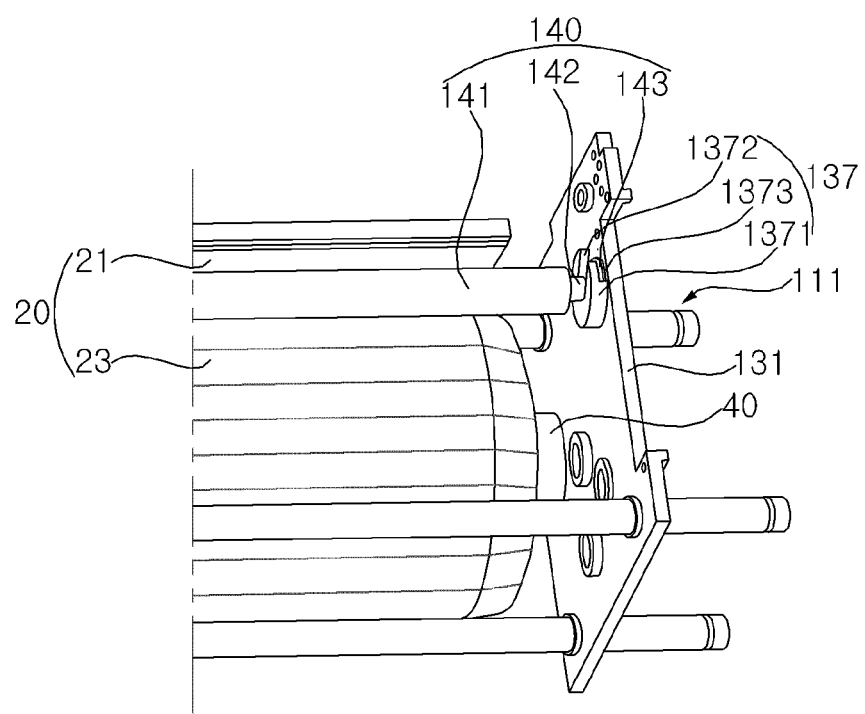
Figure 18:
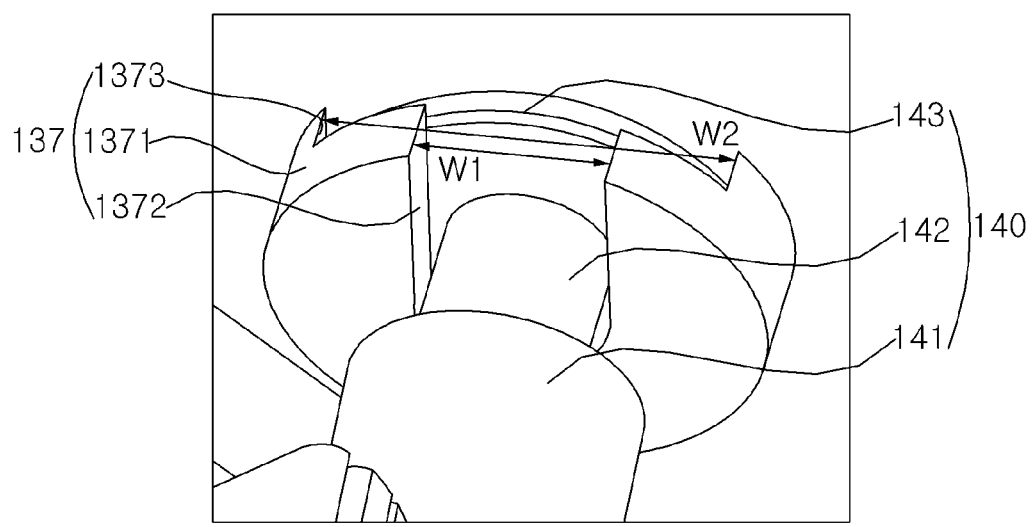
Figure 19:
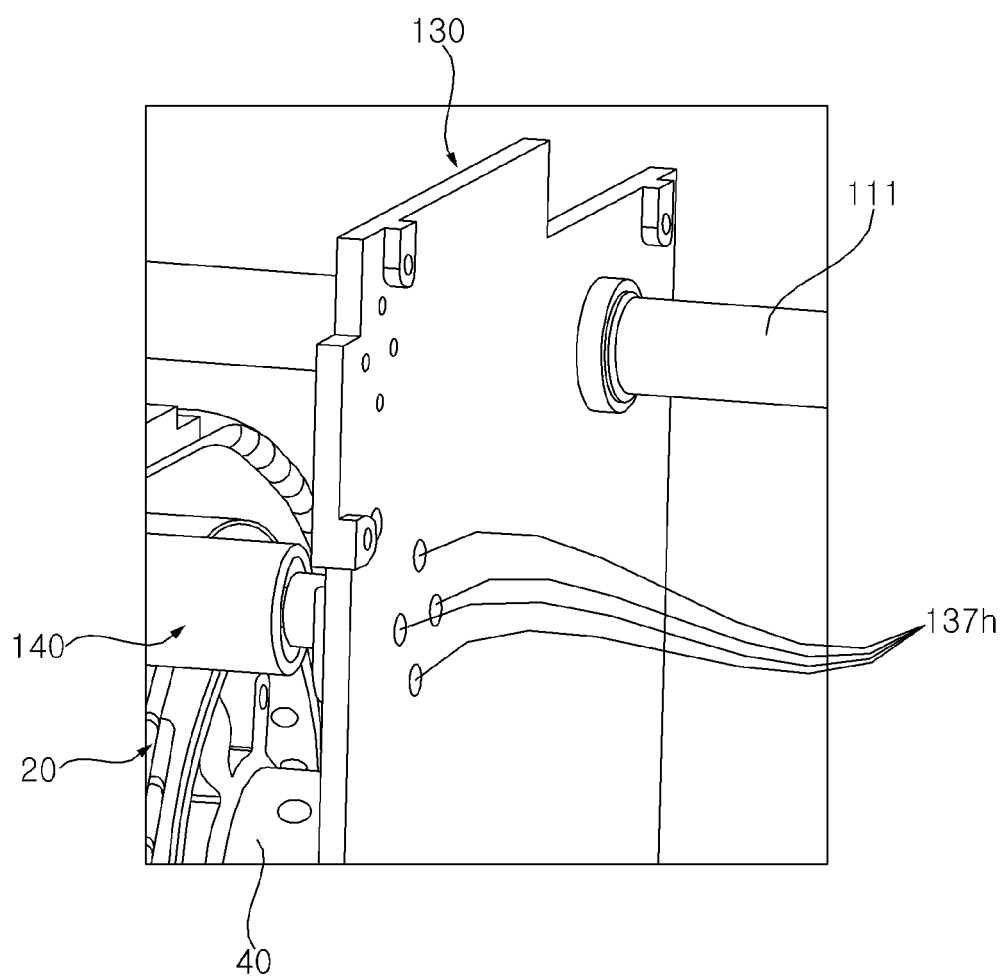

Referring to FIGS. 14 and 15, the coupler 136 may have a cylindrical shape formed by penetrating the plate 131. The coupler 136 may be fixed to the plate 131, and may be formed with the plate 131 as one body. The coupler 136 may have an outer side 1361 and an inner side 1362 with respect to the plate 131. A distance D2 of the outer side 1361 may be smaller than a distance D1 of the inner side 1362. A fastening hole 136h may be formed in the inner side 1362. The pipe 113 may be fixed to the frame 130 while the screw is fastened to the fastening hole 136h.

A first neck 1131 may form an engraved ring on the outer surface of the pipe 113 while being recessed to the inner side of the pipe 113 while being adjacent to the outer side 1361 of the coupler 136. A second neck 1132 may be adjacent to a distal end of the pipe 113, but may be spaced apart from the distal end of the pipe 113 and recessed to the inner side of the pipe 113 to form an engraved ring on the outer surface of the pipe 113. The pipe 113 may be firmly fixed to the frame 130 while a coupling ring CR3 is fastened to the first neck 1131. For example, the coupling ring CR3 may be an E-ring.

Referring to FIGS. 16 to 19, the display unit 20 wound around the panel roller 40 may be inserted between the first pipe 111, the second pipe 112, the third pipe 113, the first frame 120, and/or the second frame 130. The panel roller 40 may be disposed in parallel with the first pipe 111, the second pipe 112, or the third pipe 113.

The guide roller 140 may be coupled to the frames 120 and 130 while the panel roller 40 and the display unit 20 are located between the pipes 110 and the frames 120 and 130. The guide roller 140 may include a shaft 142, a roller 141, and a fixing plate 143.

A support portion 137 may be formed on the plate 131. The support portion 137 may support the shaft 142 of the guide roller 140. The shaft 142 may be fixed to the support portion 137, and the roller 140 can rotate on the shaft 142. The support portion 137 may be formed in the inner side of the plate 131.

The support portion 137 may include a body 1371, a shaft groove 1372, and a plate-in groove 1373. The body 1371 may have a cylindrical shape protruding from the inner surface of the plate 131. The shaft groove 1372 may be recessed to the inner side of the body 1371 from the circumference of the body 1371. The plate-in groove 1373 may be recessed to the inside of the body 1371 from the circumference of the body 1371 between the shaft groove 1372 and the plate 131. A groove width W2 of the plate-in groove 1373 may be larger than a groove width W1 of the shaft groove 1372.

In other words, the shaft groove 1372 may have a groove width W1 corresponding to the diameter of the shaft 142, and the plate-in groove 1373 may have a groove width W2 corresponding to the diameter of the fixing plate 143. The shaft 142 of the guide roller 140 may be inserted into the shaft groove 1372 of the support portion 137, and the fixing plate 143 of the guide roller may be inserted into the plate-in groove 1373 of the support portion 137 while the guide roller 140 is supported by the support portion 137.

Figure 21:
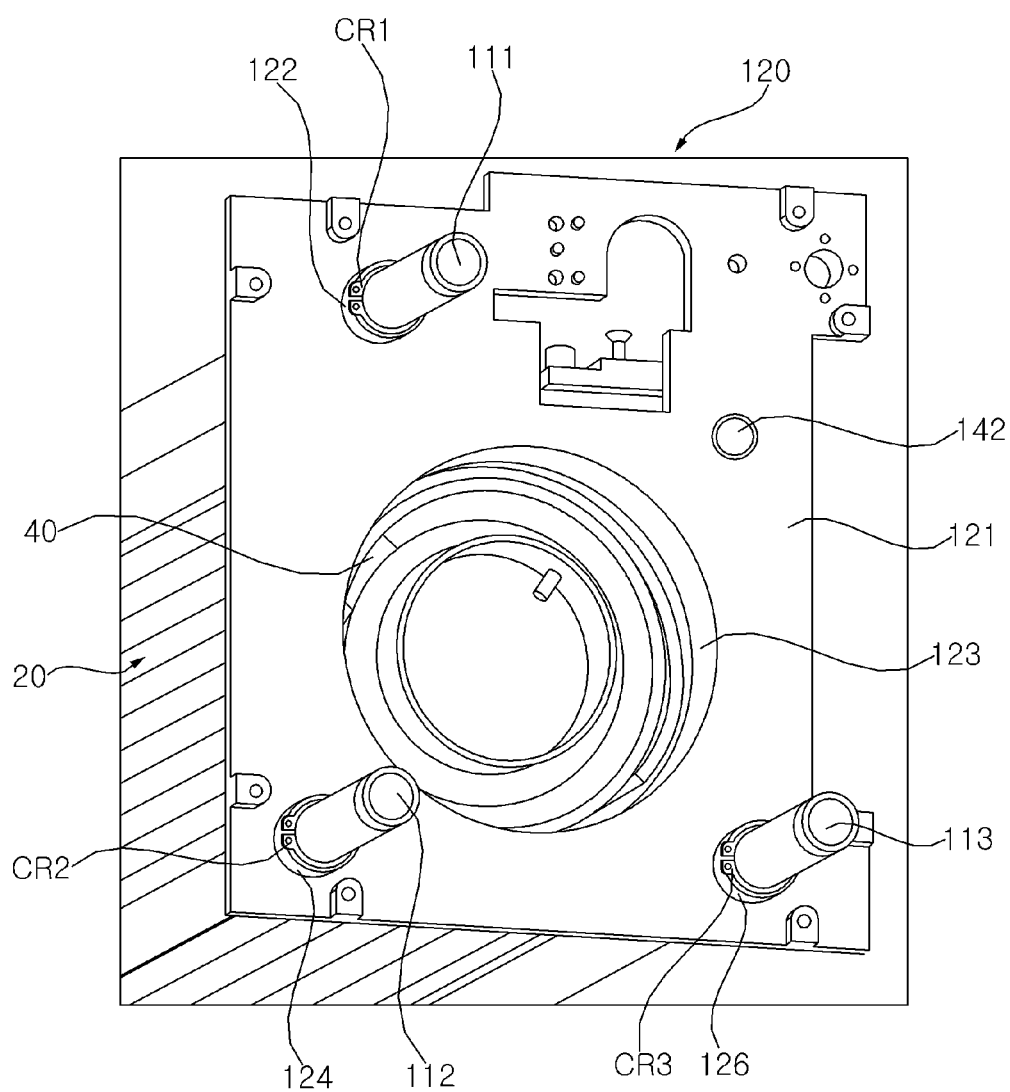
Figure 22:
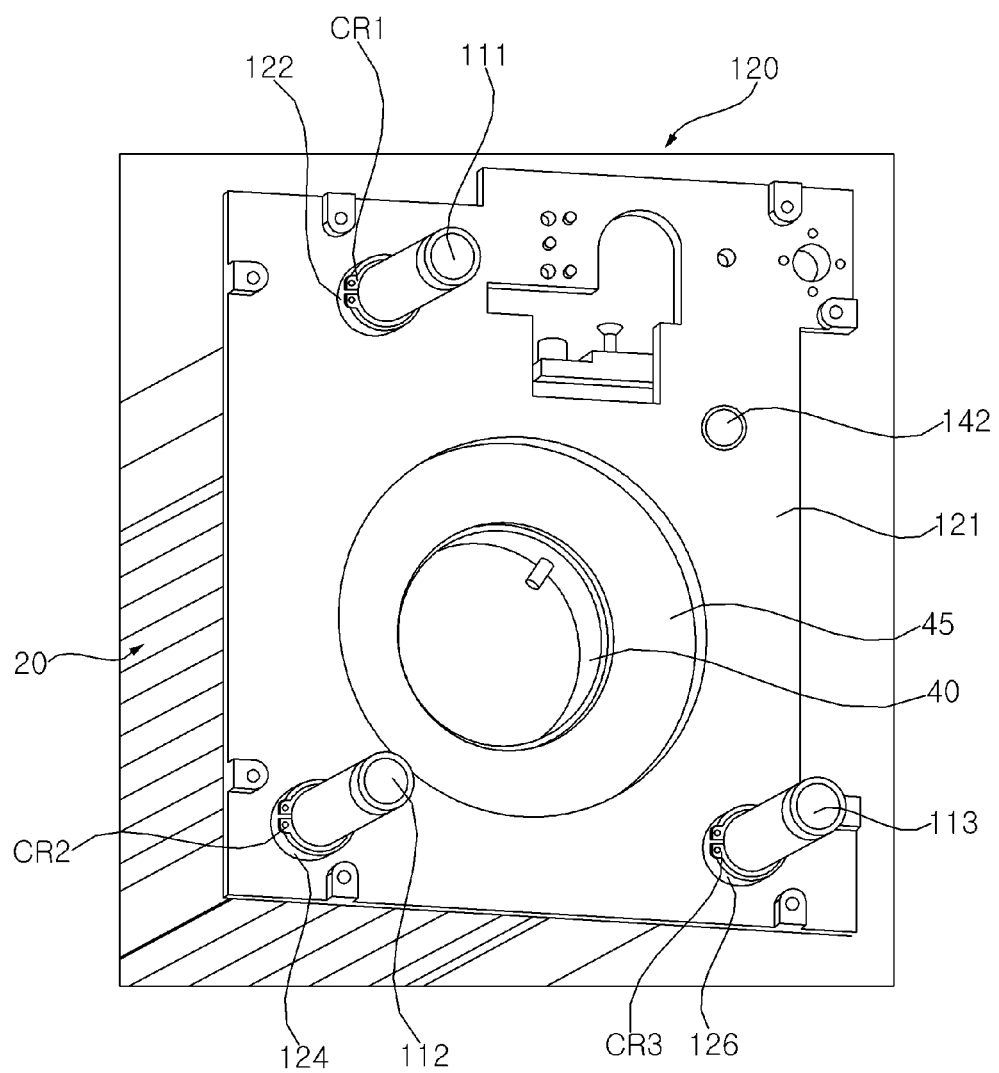
Figure 23:
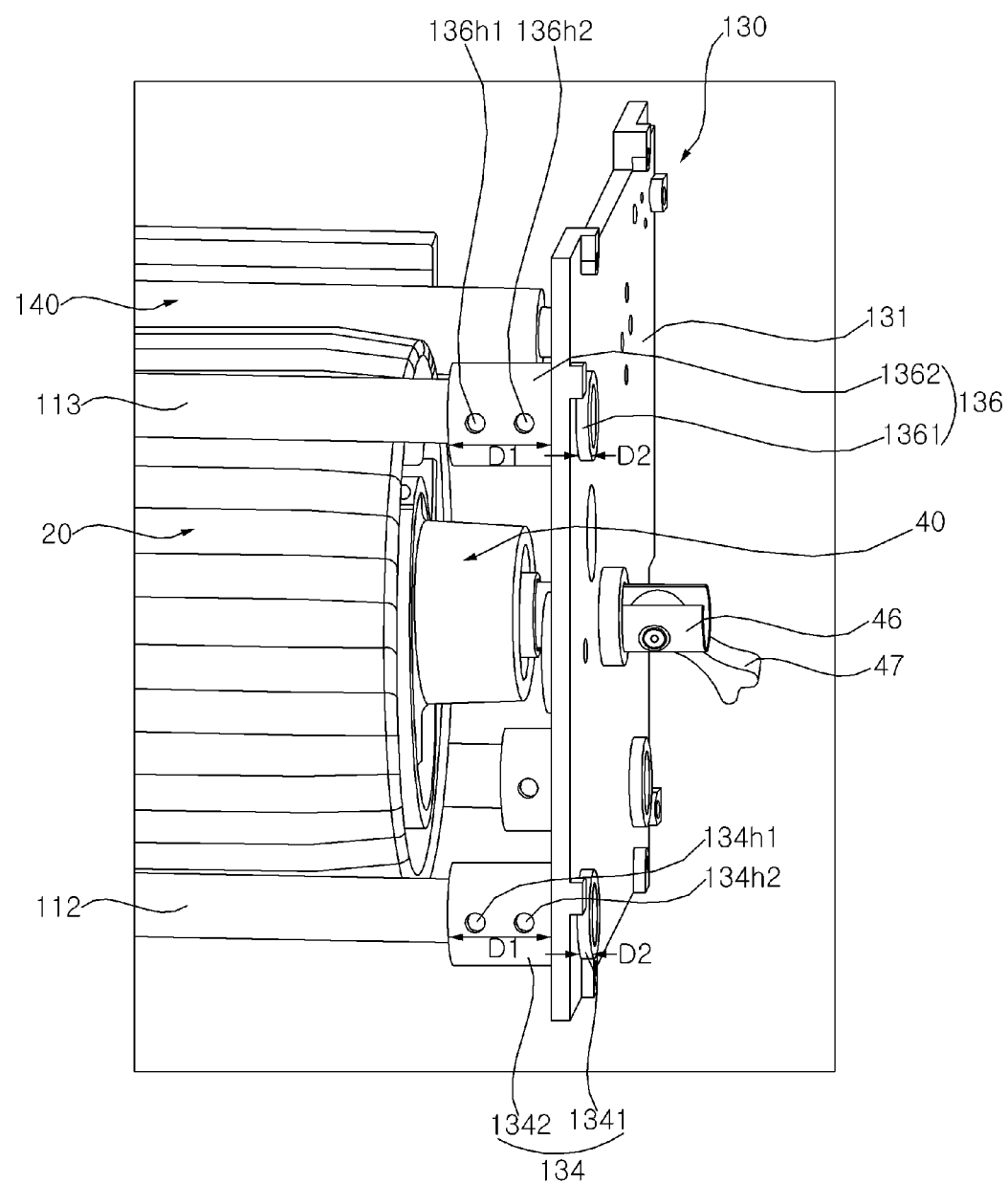
Figure 24:
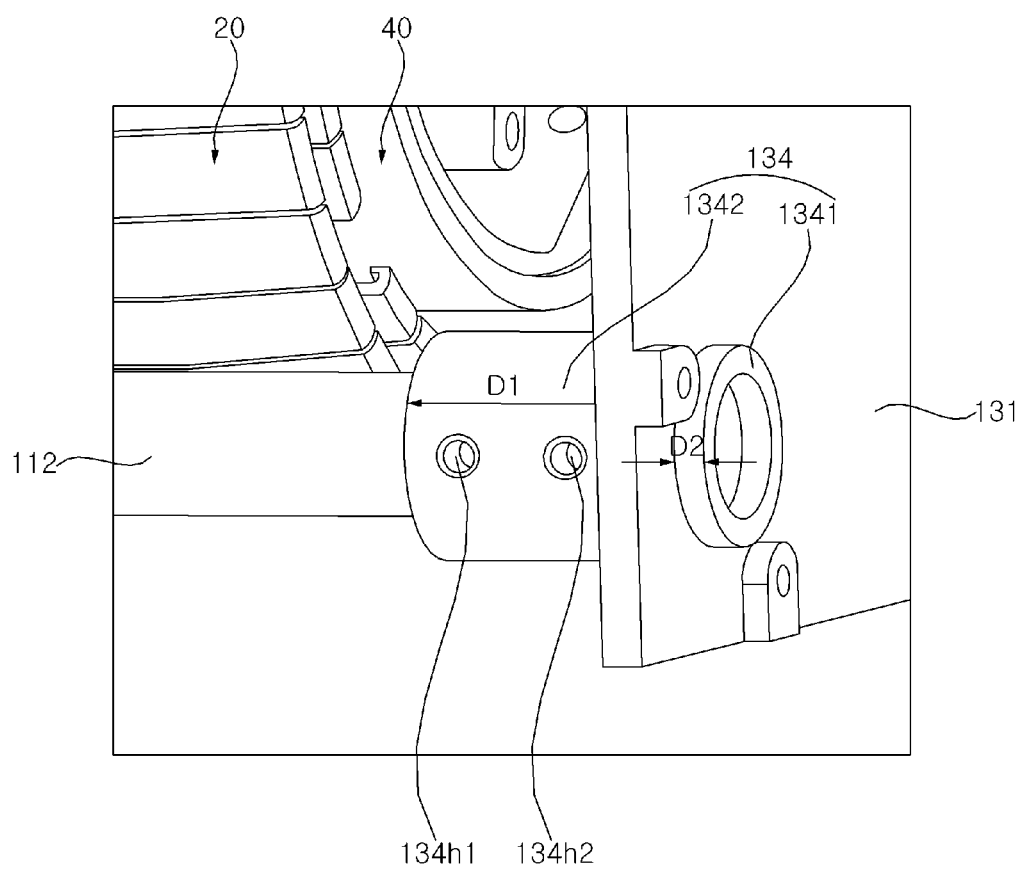

The fixing plate 143 may be fixed to the frame 130 by a fastening member (e.g. a screw) fastened to the fastening holes 137h penetrating the frame 130. Referring to FIG. 21, the shaft 142 may be inserted into and fixed to the frame 120.

Figure 20:
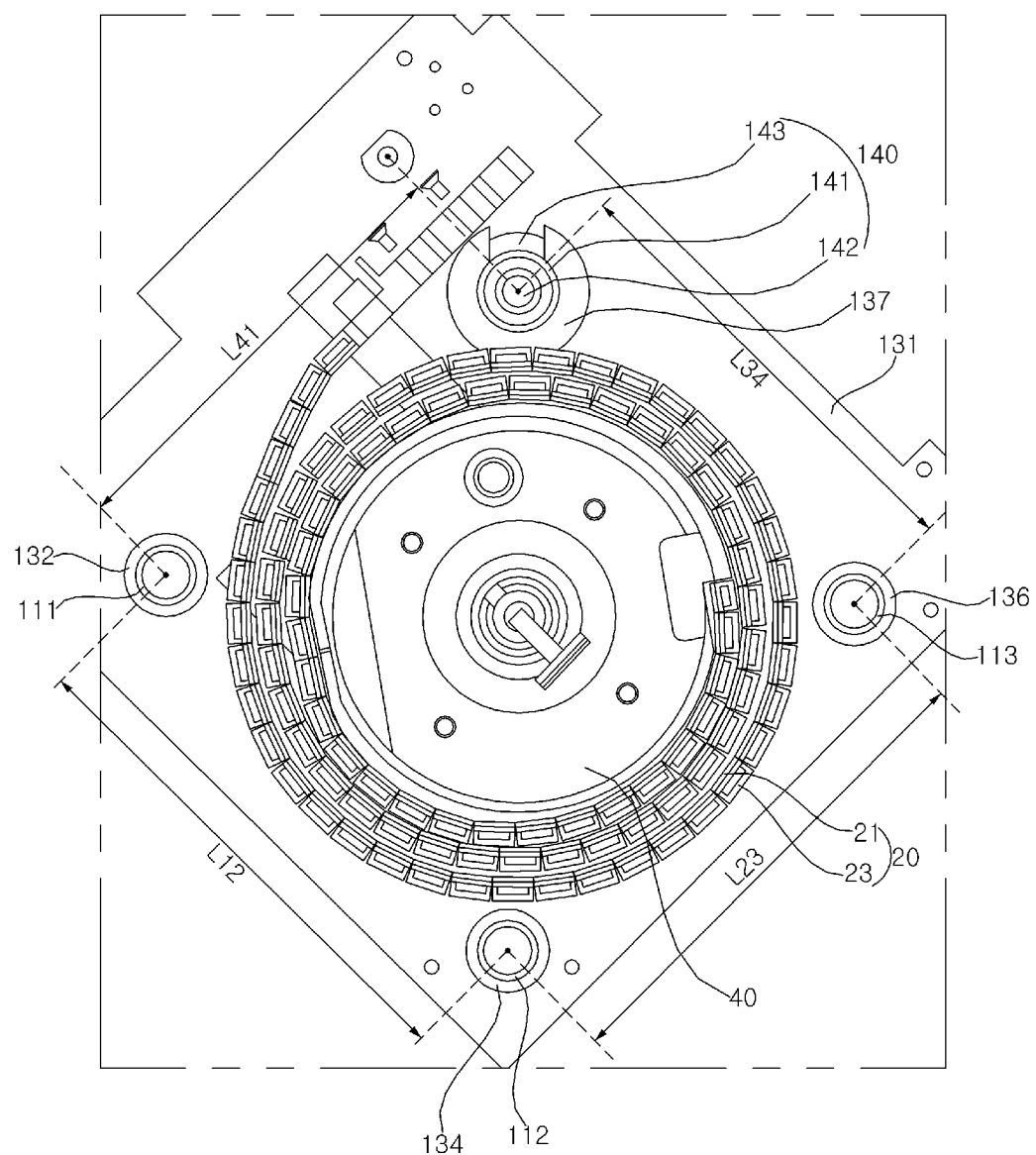

Referring to FIG. 20, a distance L12 between the first pipe 111 and the second pipe 112 may be larger than a distance L23 between the second pipe 112 and the third pipe 113. A distance L12 between the first pipe 111 and the second pipe 112 may be larger than a distance L34 between the third pipe 113 and the guide roller 140. A distance L12 between the first pipe 111 and the second pipe 112 may be larger than a distance L41 between the first pipe 111 and the guide roller 140.

A distance L23 between the second pipe 112 and the third pipe 113 may be larger than a distance L41 between the first pipe 111 and the guide roller 140. A distance L23 between the second pipe 112 and the third pipe 113 may be larger than a distance L34 between the third pipe 113 and the guide roller 140. A distance L34 between the third pipe 113 and the guide roller 140 may be larger than a distance L41 between the guide roller 140 and the first pipe 111.

Accordingly, the torsional rigidity of the display device as well as the sagging rigidity can be improved.

Referring to FIGS. 21 to 24, one end of the panel roller 40 may be located adjacent to the central opening 123 of the first frame 120. The rotation shaft of the panel roller 40 may be aligned with the center of the central opening 123 of the first frame 120. A bearing 450 may be mounted in the central opening 123 of the first frame 120. For example, the bearing 450 may be a ring bearing 450.

One end of the panel roller 40 may be inserted or press-fitted into the bearing 450. The other end of the panel roller 40 may be rotatably coupled to the second frame 130. The panel roller 40 may include a rotation shaft 46, and the rotation shaft 46 may penetrate the first frame 130 and be installed in the second frame 130. The rotating shaft 46 may be connected to a lever 47, and the panel roller 40 may be manually rotated through the lever 47.

The coupler 136 may have a cylindrical shape formed by penetrating the plate 131. The coupler 136 may be fixed to the plate 131, and may be formed with the plate 131 as one body. The coupler 136 may have an outer side 1361 and an inner side 1362 with respect to the plate 131. The distance D2 of the outer side 1361 may be smaller than the distance D1 of the inner side 1362. For example, the distance D1 of the inner side 1362 may be 5 times or more of the distance D2 of the outer side 1361.

The pipes 112 and 113 may be press-fitted to the outer sides 1341 and 1361 by penetrating inner sides 1342 and 1362 of the couplers 134 and 136. The pipes 112 and 113 may not penetrate the couplers 134 and 136. The outer sides 3141 and 1361 of the couplers 134 and 136 may cover the distal end of the pipes 112 and 113. A first fastening hole 136h1 and a second fastening hole 136h2 may be formed in the inner side 1362. As the screws are fastened to the first fastening hole 136h1 and the second fastening hole 136h2, the pipe 113 may be firmly fixed to the frame 130.

Figure 25:
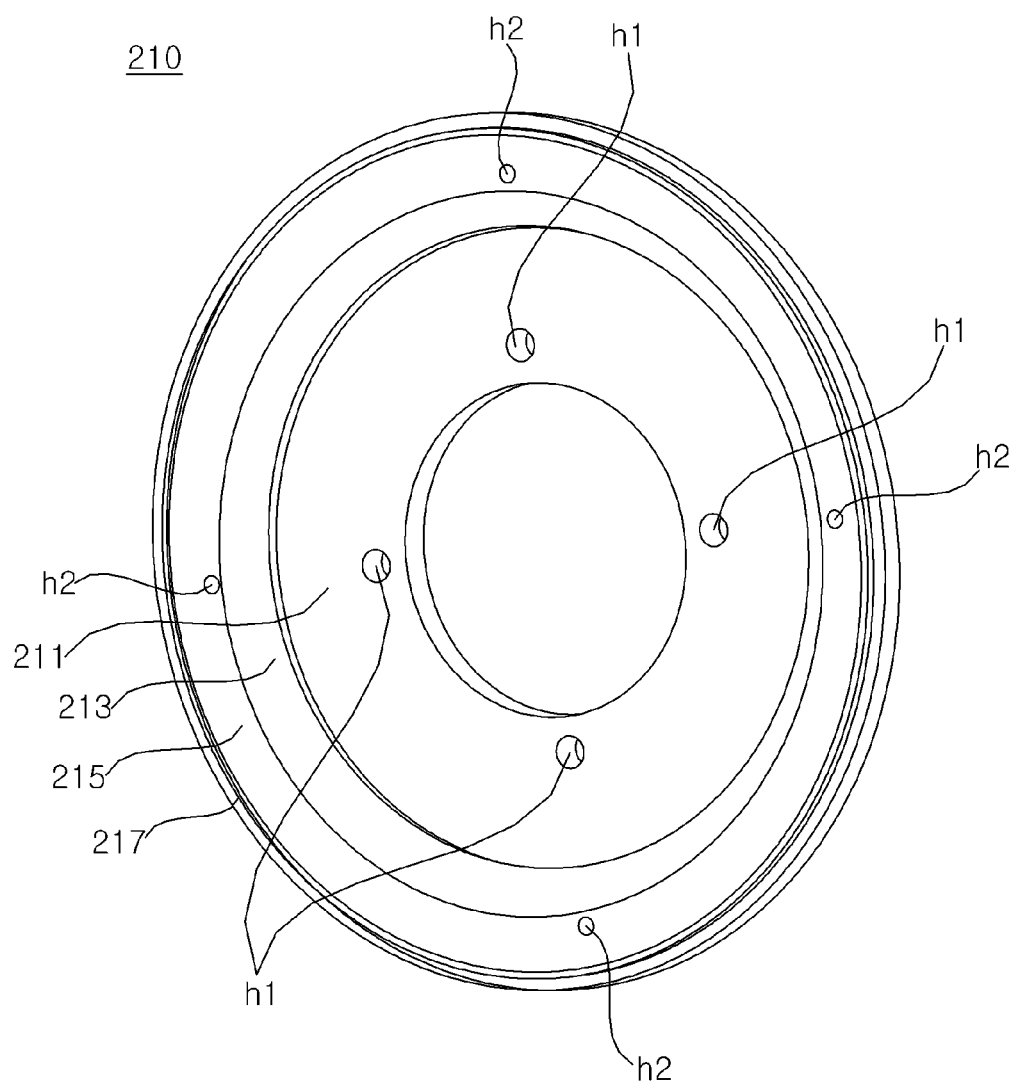
Figure 26:
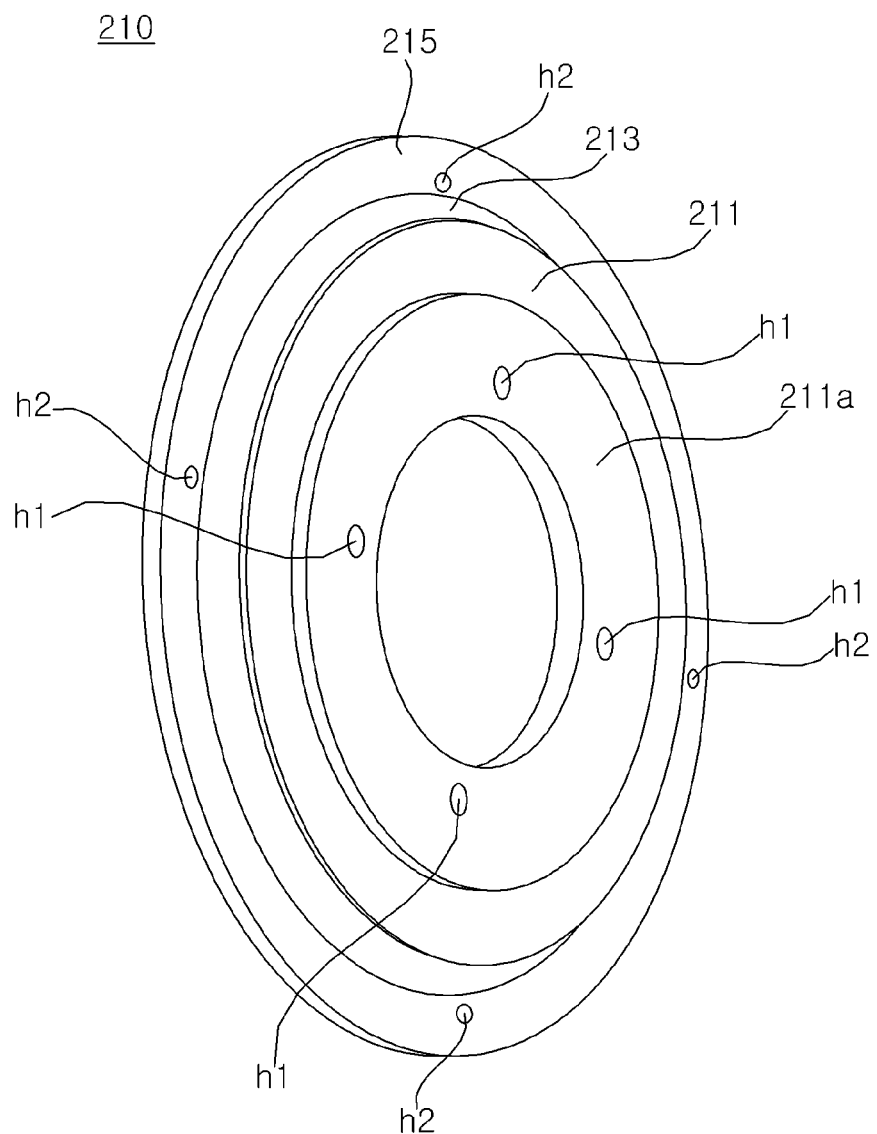
Figure 27:
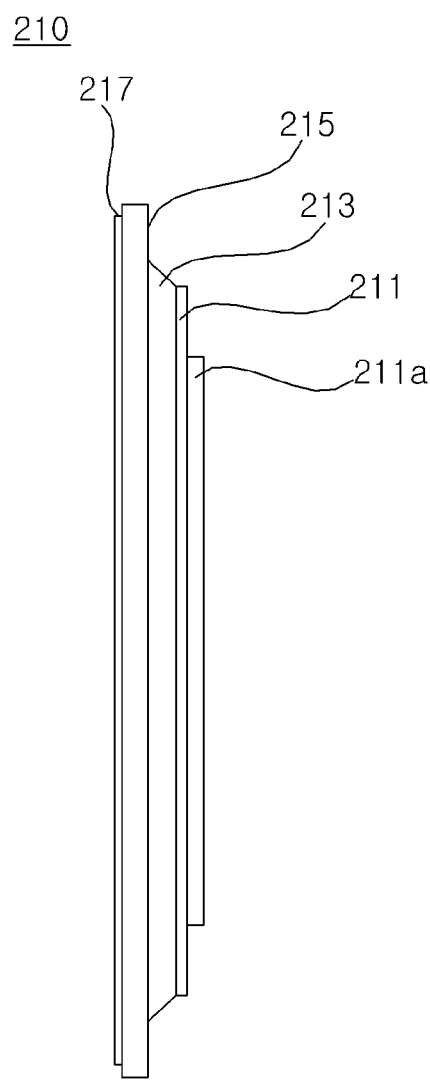

Referring to FIGS. 25 to 27, a disk wheel 210 may include an inner circle 211, an inclination portion 213, an outer circle 215, and a rim 217. The inner circle 211 may have a disk shape having an opening at a center. Holes h1 may be formed adjacent to the opening. The outer circle 215 may be referred to as a first outer circle 215.

The inclination portion 213 may extend while expanding from an edge of the outer perimeter of the inner circle 211 in a radial direction. The inclination portion 213 may have an inclination with respect to the inner circle 211 in a ring shape. The outer circle 215 may extend from an edge of the outer perimeter of the inclination portion 213. The rim 217 may be formed on one surface of the outer circle 215 along the outer perimeter of the outer circle 215. Holes h2 may be formed in the outer circle 215 while being adjacent to the boundary between the inclination portion 213 and the outer circle 215.

Figure 28:
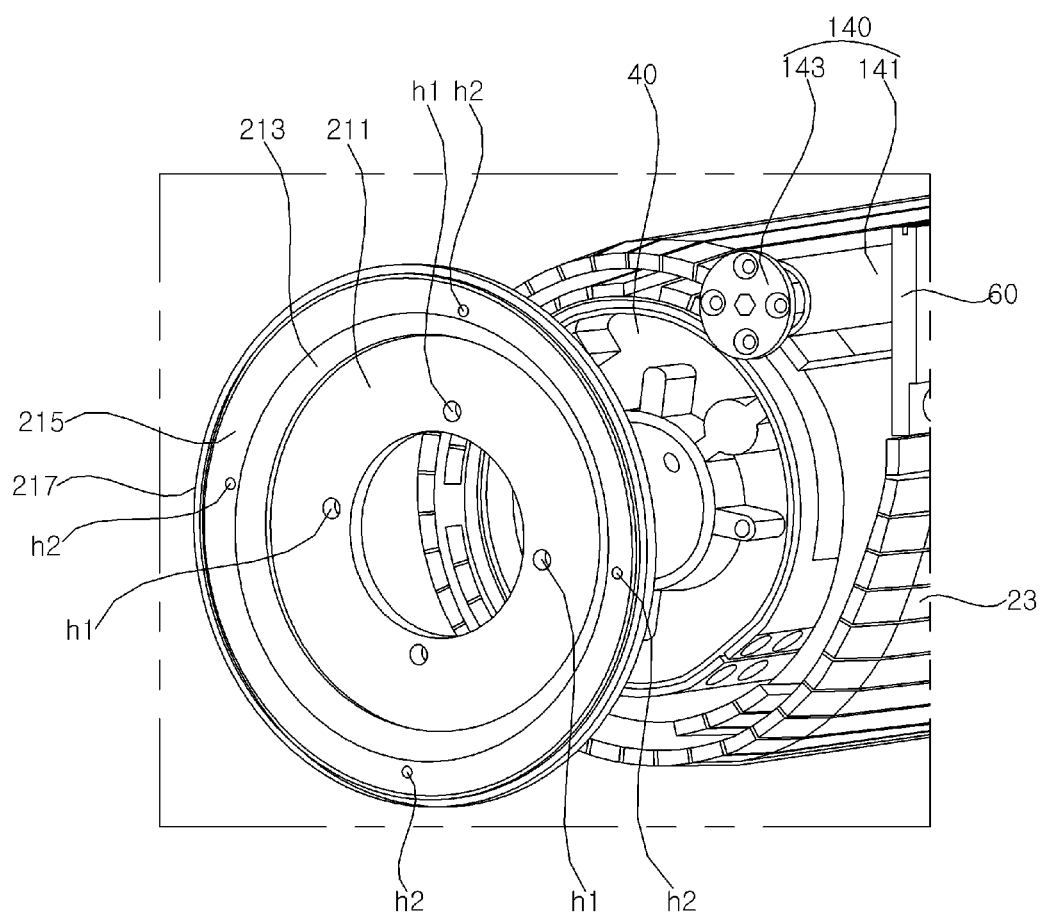
Figure 29:
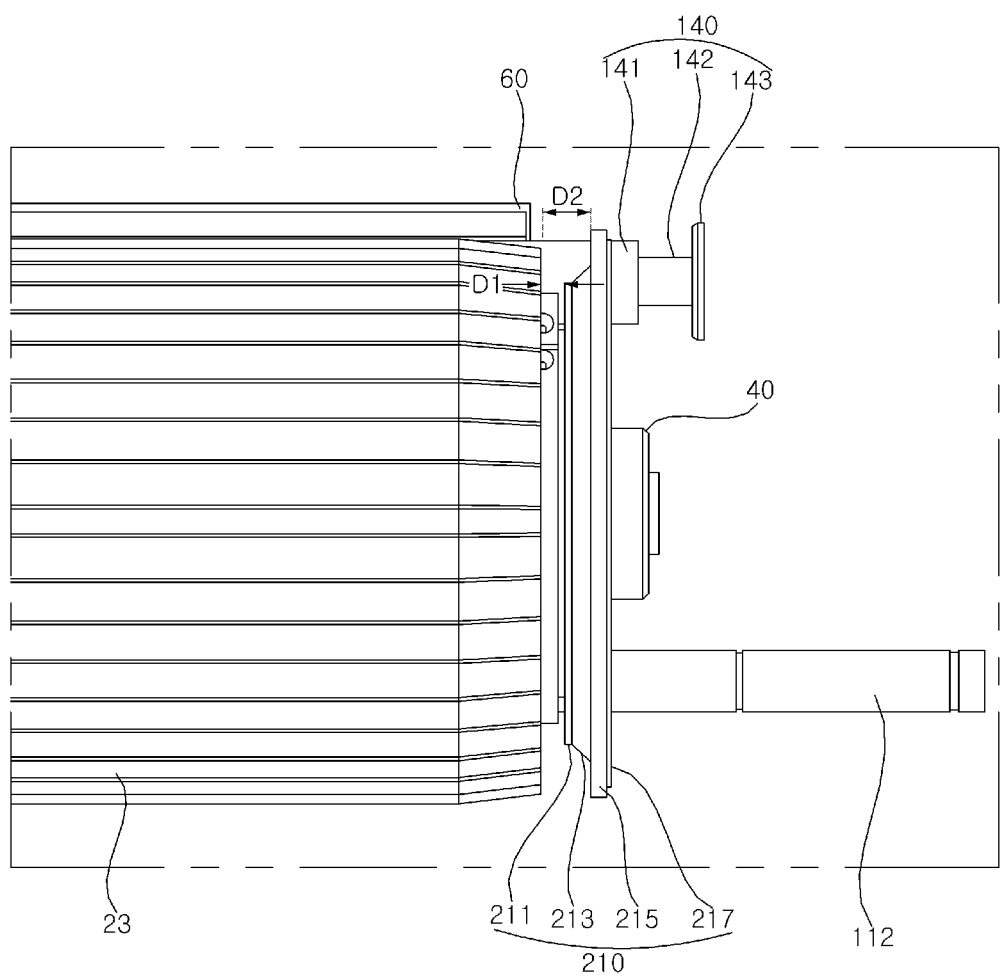

Referring to FIGS. 28 and 29, the disk wheel 210 may be coupled to the panel roller 40. The disk wheel 210 may be coupled to one end of the panel roller 40. The disk wheel 210 may be coupled to the side surface of the panel roller 40 by a fastening member penetrating the holes h1. The distance D1 between one end of the module cover 23 wound around the panel roller 40 and the inner circle 211 may be smaller than the distance D2 between one end of the module cover 23 wound around the panel roller 40 and the outer circle 215.

Figure 30:
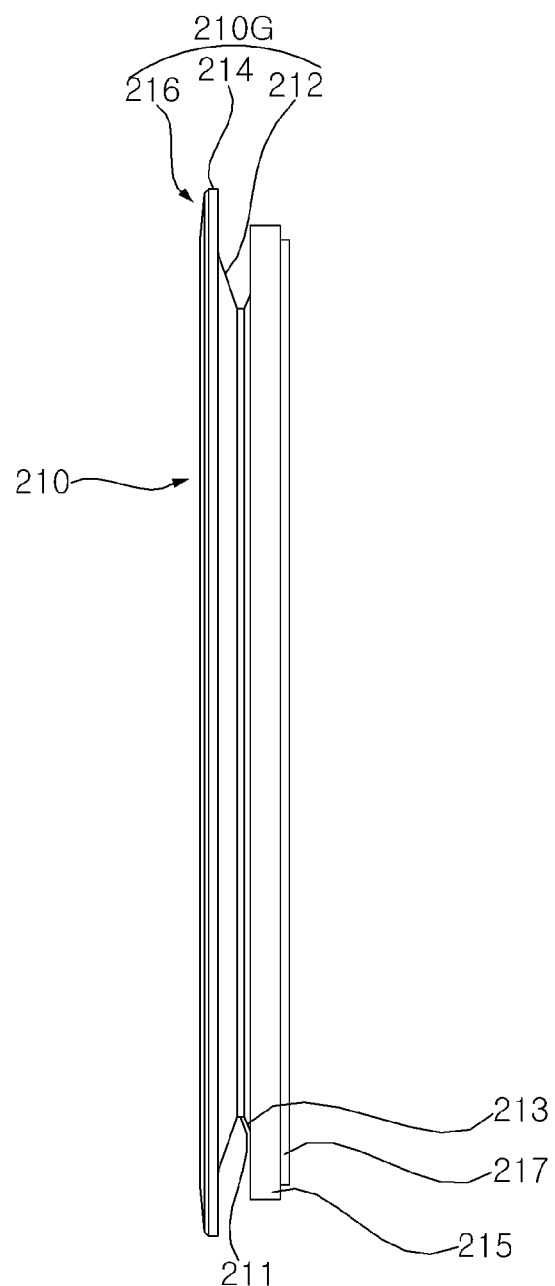
Figure 31:
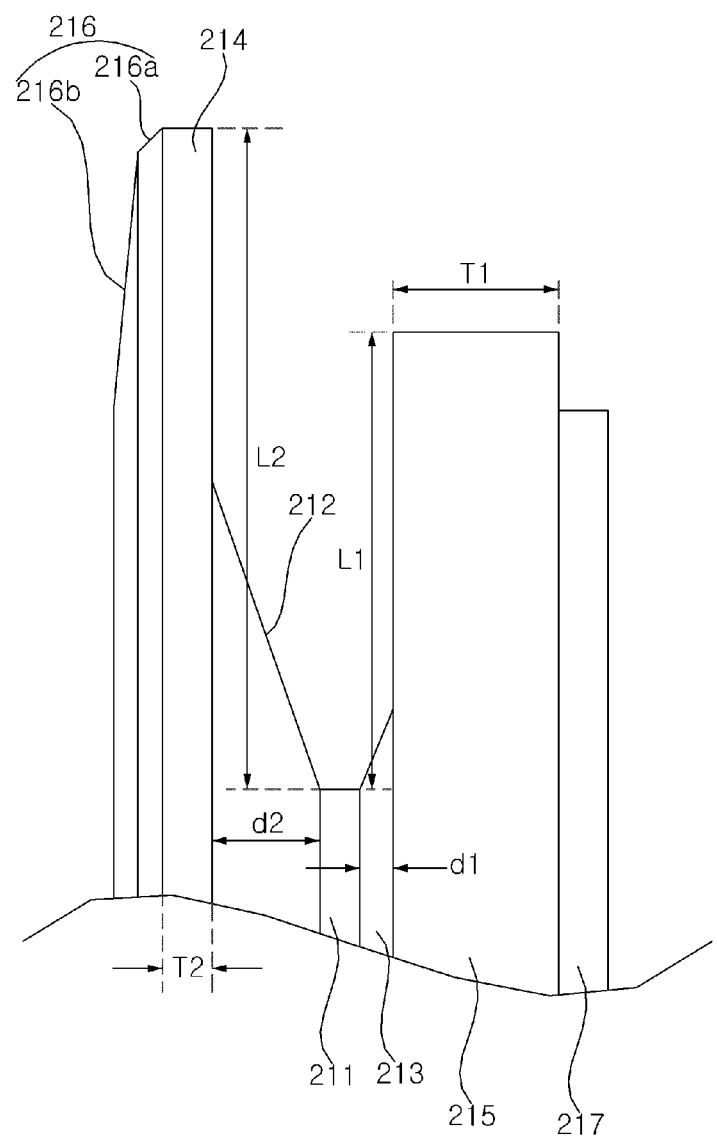

Referring to FIGS. 30 and 31, the disk wheel 210 may further include a guide wheel 210G. The guide wheel 210G may face the outer circle 215 with respect to the inner circle 211. The guide wheel 210G may include an inclination portion 212, a middle part 214, and a guide portion 216. The middle part 214 may be referred to as a second outer circle 214.

The inclination portion 212 may face the inclination portion 213 with respect to the inner circle 211. The inclination portion 212 may extend while expanding from an edge of the outer perimeter of the inner circle 211 in a radial direction. The inclination portion 212 may have an inclination with respect to the inner circle 211. The thickness d2 of the inclination portion 211 may be larger than the thickness d1 of the inclination portion 213.

The middle part 214 may have a disk shape extending from the edge of the outer perimeter of the inclination portion 212. The middle part 214 may be located in parallel with the outer circle 215. The thickness T1 of the outer circle 215 may be larger than the thickness T2 of the middle part

214. For example, the thickness T1 of the outer circle 215 may be two times or more of the thickness T2 of the middle part 214. The distance L1 between the circumference of the inner circle 211 and the circumference of the outer circle 215 may be smaller than the distance L2 between the circumference of the middle part 214 and the circumference of the inner circle 211. Accordingly, the middle part 214 can protect the module cover 23 (refer to FIG. 32) wound around the panel roller 40.

The guide portion 216 may include a first guide portion 216*a* and a second guide portion 216*b*. The first guide portion 216*a* may extend from the circumference of the middle part 214 while converging inward in the radial direction. When the inclination of the inclination portion 212 is a positive inclination, the inclination of the first guide portion 216*a* may be a negative inclination. The second guide portion 216*b* may extend from the circumference of the first guide portion 216*a* while converging inward in the radial direction. When the inclination of the inclination portion 212 is a positive inclination, the inclination of the second guide portion 216*b* may be a negative inclination. With respect to the radial direction, the inclination of the second guide portion 216*b* may be smaller than the inclination of the first guide portion 216*a*. Accordingly, when the module cover 23 is wound around the panel roller 40, a guide wheel 210G may guide the module cover 23 step by step.

Figure 32:
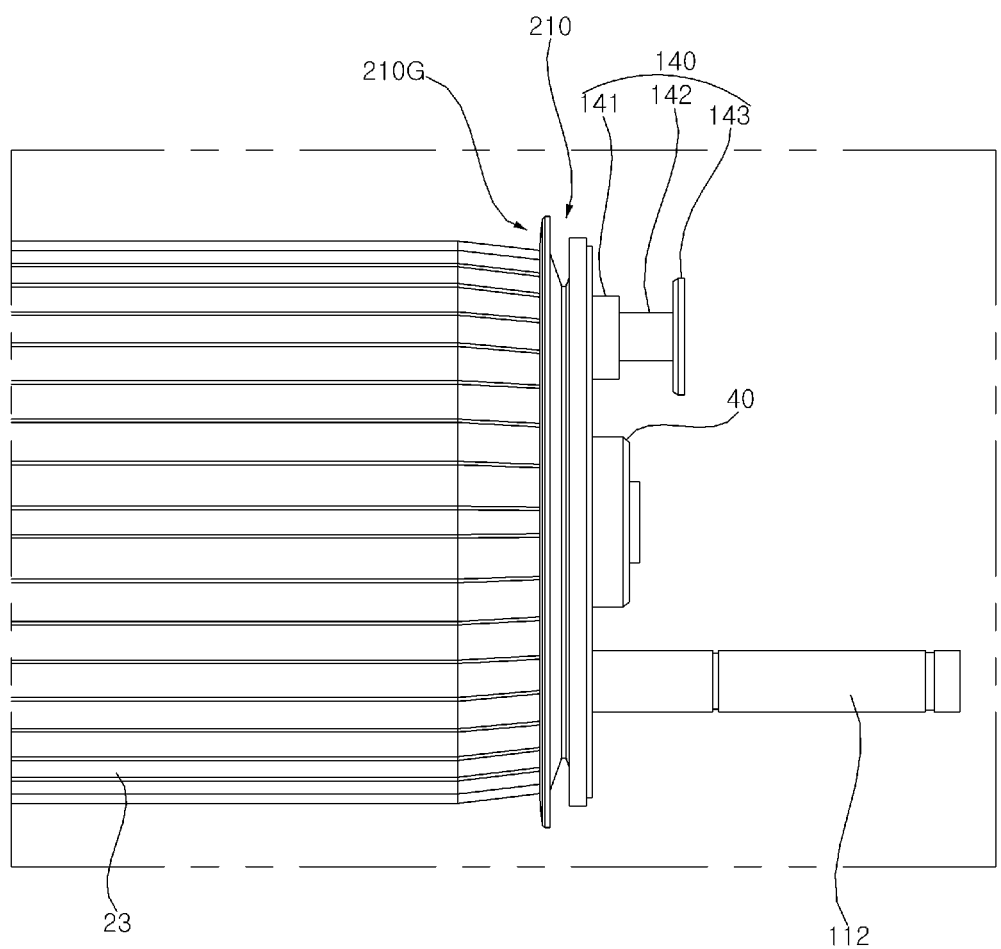

Referring to FIG. 32, while the module cover 23 is wound around the panel roller 40, the module cover 23 may be stacked on the circumference of the panel roller 40. As the module cover 23 is stacked on the panel roller 40, the side surfaces of the module cover 23 may not be evenly aligned.

If the module cover 23 is wound around the panel roller 40 without being evenly aligned, the display panel 21 (refer to FIG. 4) may be wound around the panel roller 40 while being twisted or crumpled. In this case, the display panel 21 may be damaged.

When the module cover 23 is wound around the panel roller 40, the side surface of the module cover 23 may be guided to a proper position by the guide portion 216 of the guide wheel 210G. When the module cover 23 is stacked while being wound around the panel roller 40 several times, the side surface of the module cover 23 may be aligned by the guide portion 216 of the guide wheel 210G.

The side surface of the module cover 23 is primarily guided by the first guide portion 216*a*, and is secondarily guided by the second guide portion 216*b* so that the module cover 23 is wound around the panel roller 40. Accordingly, the display panel 21 may be prevented from being wound around the panel roller 40 while being twisted or crumpled.

Figure 33:
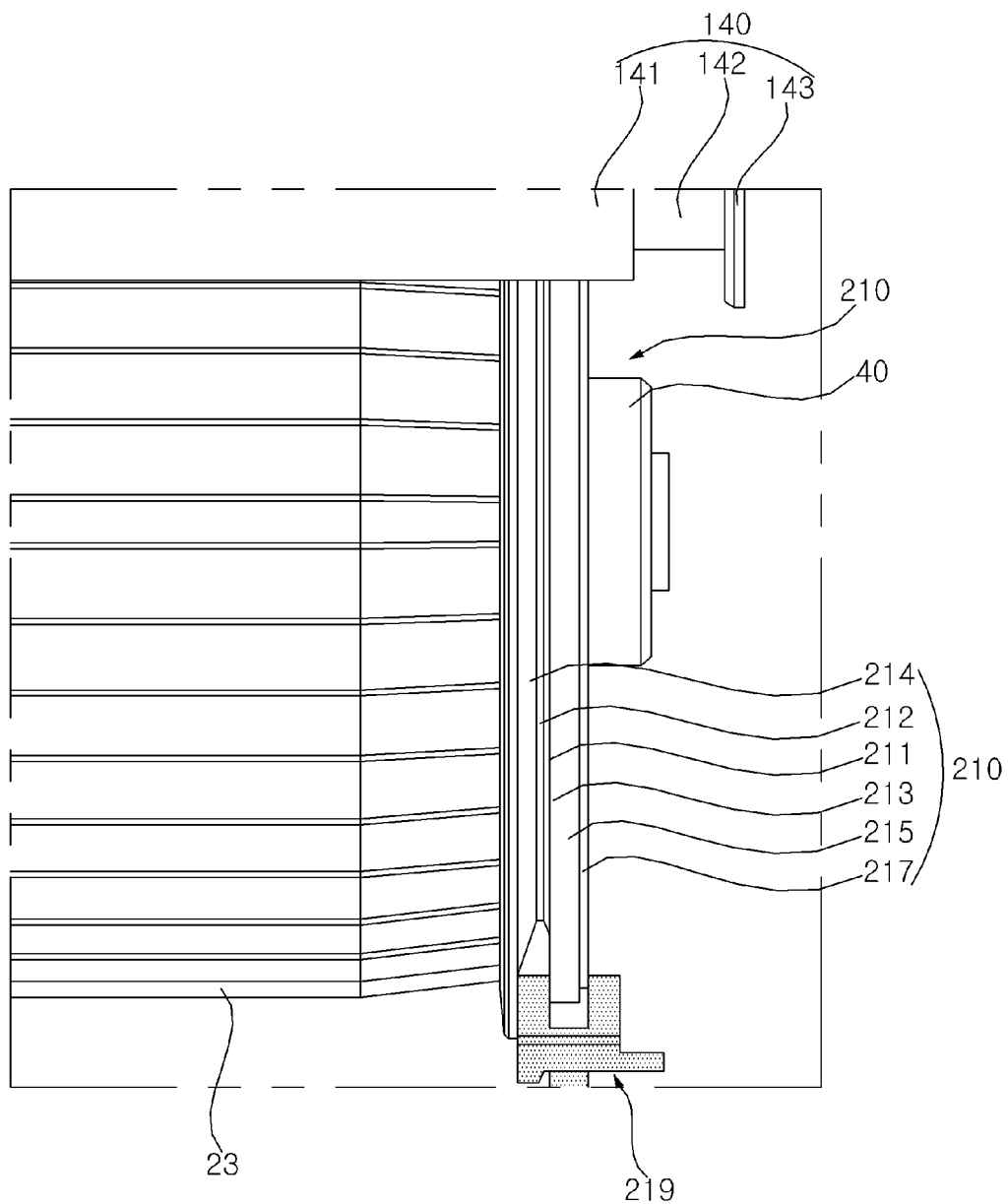
Figure 34:
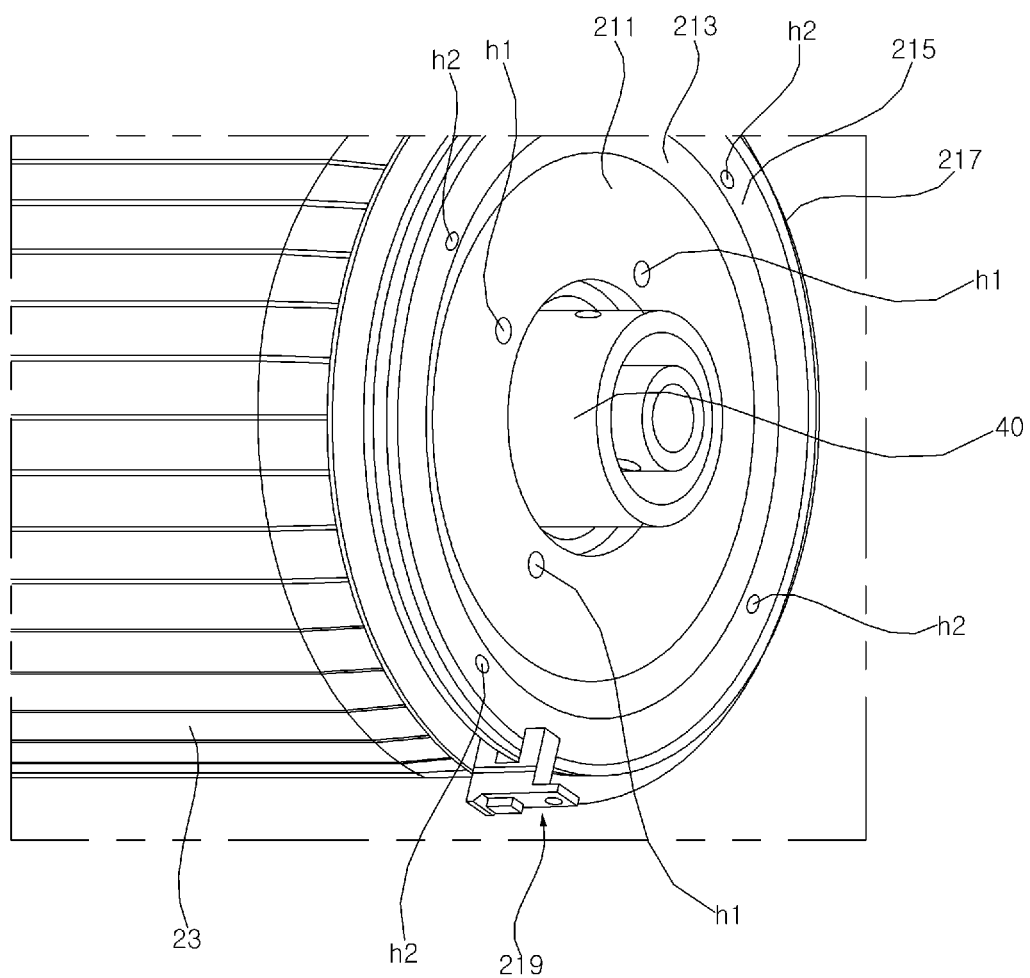

Referring to FIGS. 33 and 34, a brake 219 may be located while being adjacent to the disc wheel 210. The brake 219 may reduce the rotation speed of the disk wheel 210 or stop the rotation of the disk wheel 210.

The brake 219 may hold the outer circle 215 and/or the rim 217 of the disc wheel 210. Accordingly, the rotation of the panel roller 40 can be controlled by reducing the rotation speed of the panel roller 40.

Figure 35:
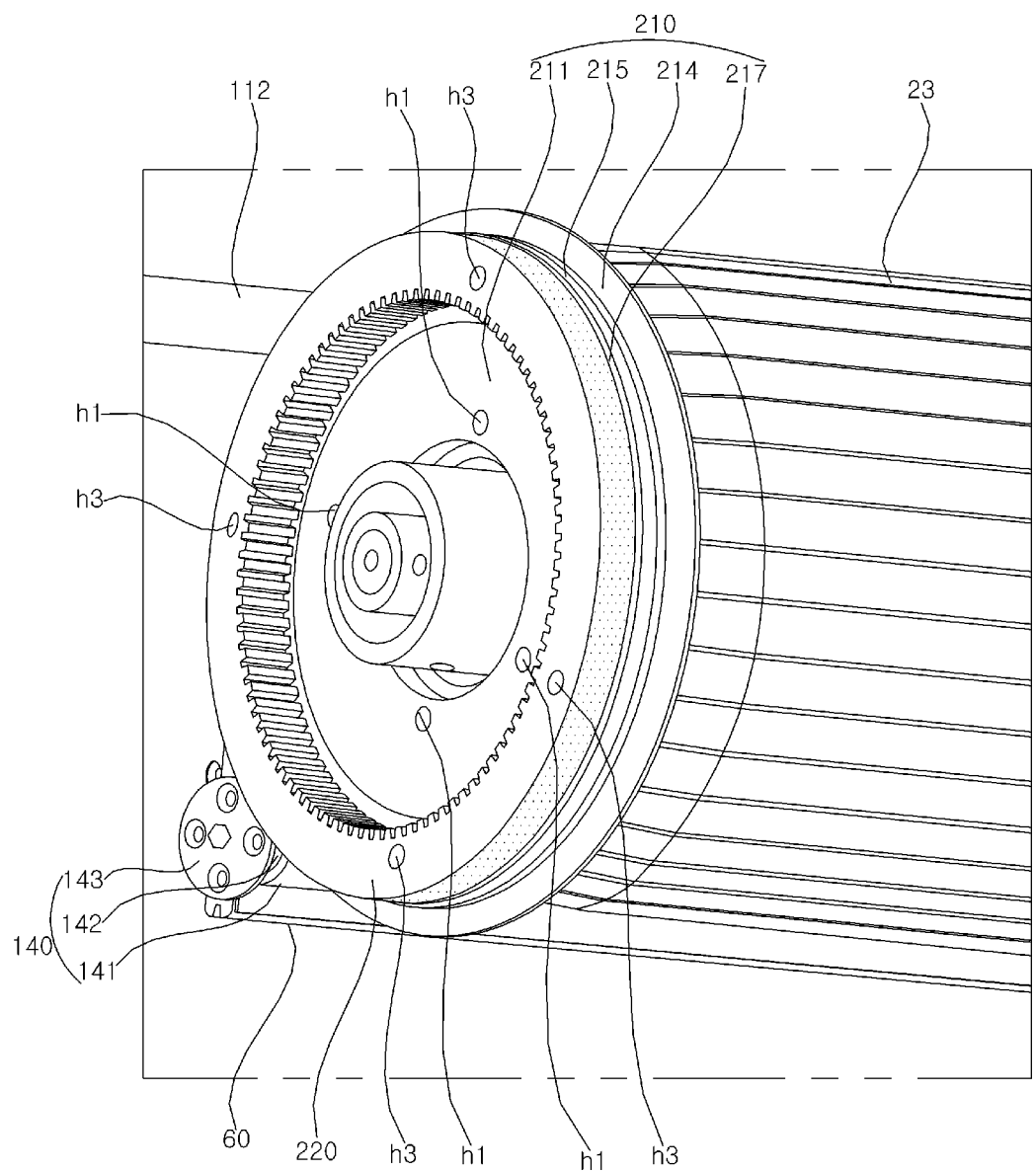

Referring to FIG. 35, the driving gear 220 may be coupled to the disk wheel 210. For example, the driving gear 220 may be a ring-shaped inner ring gear. The outer diameter of the driving gear 220 may be substantially equal to or slightly larger than the inner diameter of the rim 217. The driving gear 220 may be inserted or press-fitted to the rim 217. The driving gear 220 may be referred to as a third gear 220.

Holes h3 may be sequentially formed on the side surface of the driving gear 220 along the circumferential direction of the driving gear 220. The holes h3 of the driving gear 220 may correspond to the holes h2 (refer to FIG. 28) of the disk wheel 210. The fastening member may penetrate the holes h3, so that the driving gear 220 may be fixed to the disk wheel 210. The rotation of the driving gear 220 may be the same as the rotation of the disk wheel 210.

Figure 36:
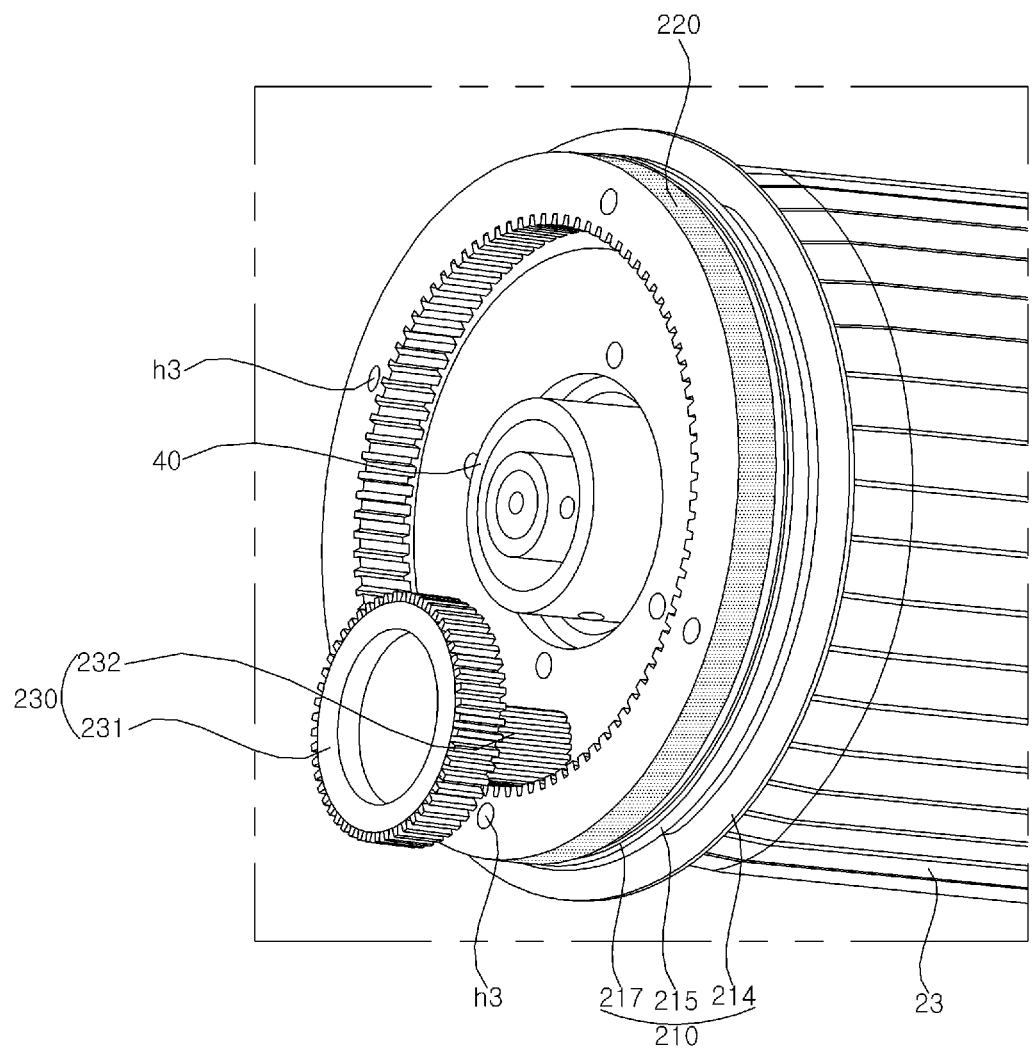
Figure 37:
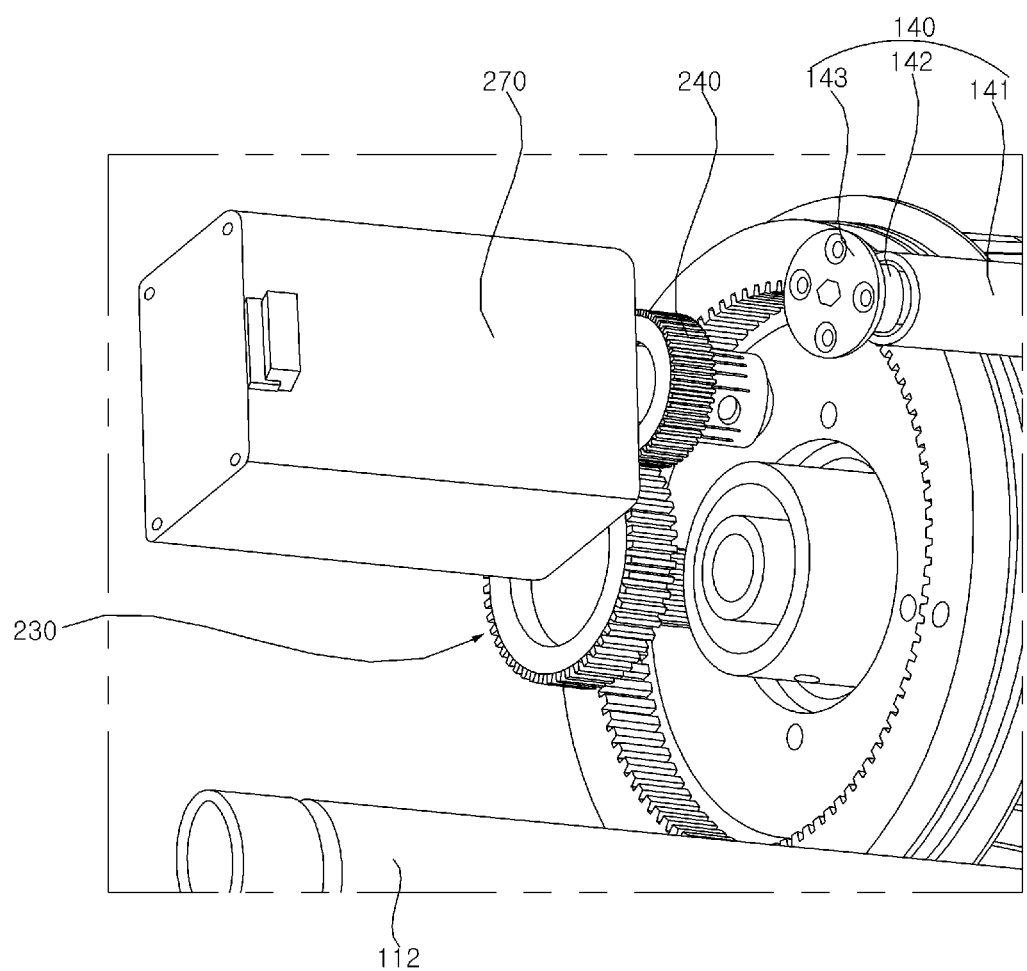

Referring to FIGS. 36 and 37, an intermediate gear 230 may mesh with the driving gear 220. The intermediate gear 230 may include an outer gear 231 and an inner gear 232. The diameter of the outer gear 231 may be larger than the diameter of the inner gear 232. The outer gear 231 may have the same rotation shaft as the inner gear 232. The inner gear 232 may mesh with gear teeth in the inner side of the driving gear 220.

A motor gear 240 may be fixed to the rotation shaft of the motor 270. The motor gear 240 may mesh with the outer gear 231 of the intermediate gear 230. The intermediate gear 230 may be referred to as a second gear 230, and the motor gear 240 may be referred to as a first gear 240.

As the rotation shaft of the motor 270 rotates, the motor gear 240 may rotate. The outer gear 231 of the intermediate gear 230 may be rotated by meshing with the motor gear 240. The inner gear 232 of the intermediate gear 230 that rotates together with the outer gear 231 of the intermediate gear 230 may rotate the driving gear 220. Accordingly, the motor 270 may provide a rotational force to the panel roller 40.

Figure 38:
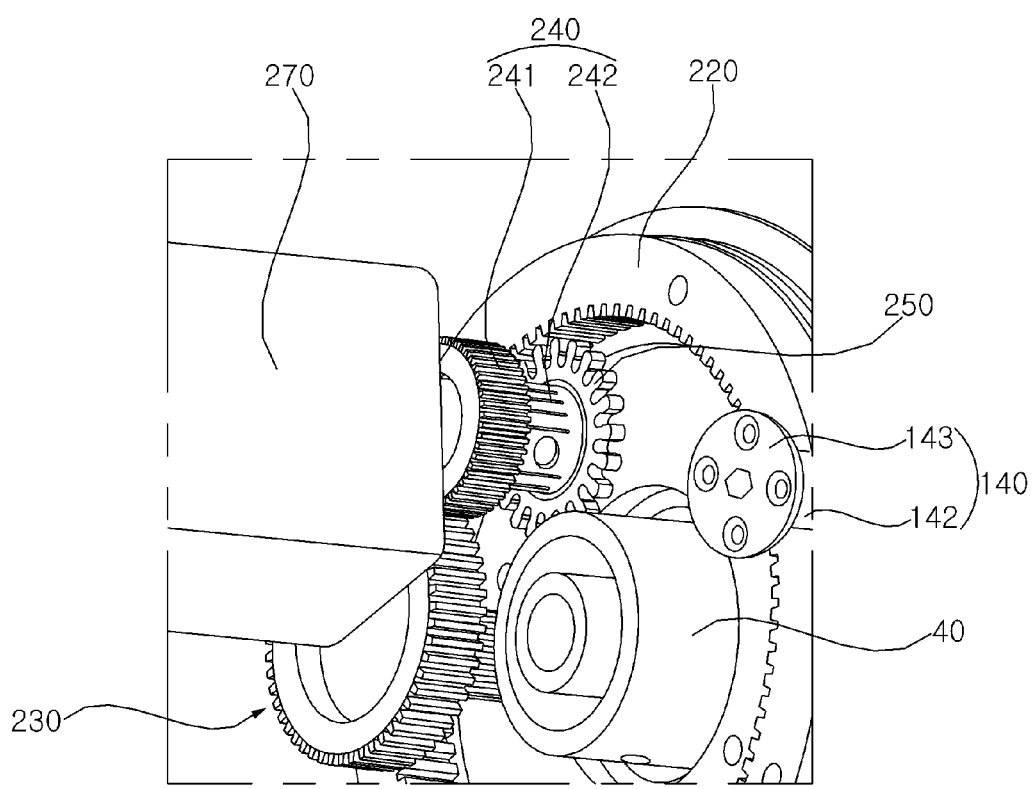
Figure 39:
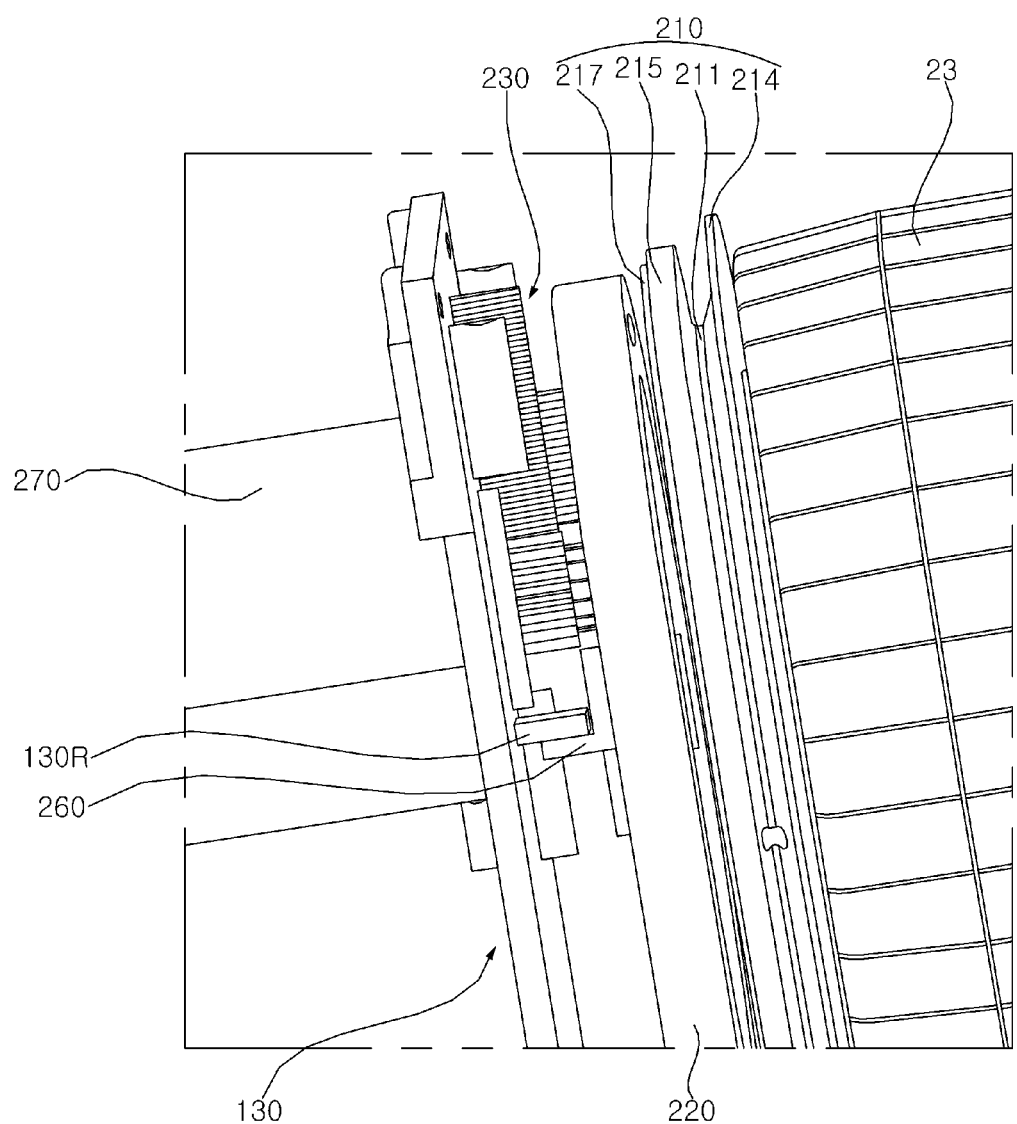

Referring to FIGS. 38 and 39, a rotation indicator 250 may be coupled to the motor gear 240. The motor gear 240 may include a gear tooth 241 and a gear shaft 242. The rotation indicator 250 may be fitted to the gear shaft 242.

The rotation indicator 250 may have a disk shape. The rotation indicator 250 may have a plurality of protrusions on the circumference. The plurality of protrusions may be sequentially disposed along the circumferential direction on the circumference of the rotation indicator 250.

A sensor 260 may be located adjacent to the rotation indicator 250. For example, the sensor 260 may be a photosensor. The sensor 260 may detect the rotation of the rotation indicator 250. The sensor 260 may be fixed to the inner surface of the frame 130. A sensor fixing rib 130R may protrude from the inner surface of the frame 130. The sensor 260 may be fixed to the sensor fixing rib 130R. The sensor 260 and/or the rotation indicator 250 may be located in the inner side of the driving gear 220.

According to an aspect of the present disclosure, provided is a display device including: a flexible display panel; a roller which extends long, and around which the display panel is wound, or from which the display panel is unwound; and a disc wheel which is located adjacent to edges of stacked display panel while being wound around the roller, crosses a rotation shaft of the roller, and is coupled to the roller, wherein a diameter of the disk wheel is larger than a diameter of the display panel wound around the roller.

In addition, according to another aspect of the present disclosure, the disc wheel includes: an inner circle fixed to the roller; a first outer circle which forms a step toward an outer side in a rotation shaft direction of the roller from a circumference of the inner circle; and a second outer circle which faces the outer circle with respect to the inner circle, and forms a step inward in the rotation shaft direction of the roller.

In addition, according to another aspect of the present disclosure, a diameter of the second outer circle is larger than a diameter of the first outer circle.

In addition, according to another aspect of the present disclosure, the second outer circle includes a guide portion formed by chamfering an edge between a circumference of the second outer circle and a plane of the second outer circle facing edges of the display panel.

In addition, according to another aspect of the present disclosure, the disk wheel further includes a brake which is fixed to the roller, is rotated together with the roller, is located adjacent to the disk wheel, and brakes a rotation of the disk wheel.

In addition, according to another aspect of the present disclosure, the display device further includes a driving gear fixed to a plane of a first outer circle of the disk wheel; an intermediate gear meshing with the driving gear; and a motor gear meshing with the intermediate gear.

In addition, according to another aspect of the present disclosure, the driving gear is an inner wheel gear, and the intermediate gear includes: an outer gear meshing with the motor gear; and an inner gear meshing with the driving gear.

In addition, according to another aspect of the present disclosure, the display device further includes a motor rotating the motor gear; a sensor plate which is fixed to a rotation shaft of the motor gear, and has a plurality of protrusions sequentially disposed along a circumferential direction; and a sensor which is located adjacent to the sensor plate, and detects a rotation of the sensor plate.

In addition, according to another aspect of the present disclosure, the display device further includes: a first pipe which extends long in a length direction of the roller, and is located adjacent to the roller; and a second pipe which extends long in the length direction of the roller, is located adjacent to the roller, and faces the first pipe with respect to the roller.

In addition, according to another aspect of the present disclosure, the display device further includes: a first frame which is located adjacent to one end of the roller; and a second frame which is located adjacent to the other end of the roller, and faces the first frame with respect to the roller, wherein the first pipe and the second pipe are inserted by penetrating the first frame, wherein the first pipe and the second pipe are inserted by penetrating the second frame, wherein the motor is fixed to the first frame, wherein the sensor is fixed to a rib protruding from an inner side of the first frame.

In addition, according to another aspect of the present disclosure, the display device further includes: a module cover which extends long in a length direction of the roller, and has a plurality of segments sequentially arranged in an up-down direction of the display panel at a rear surface of the display panel, wherein the display panel and the module cover are wound around or unwound from the roller.

In addition, according to another aspect of the present disclosure, the display panel descends while being unwound from the roller, and ascends while being wound around the roller.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a flexible display panel;
a roller which extends in a long direction, and around which the flexible display panel is wound, or from which the flexible display panel is unwound; and
a disc wheel which is located adjacent to edges of flexible display panel which is wound around the roller, which crosses a rotation shaft of the roller, and which is coupled to the roller,
wherein a diameter of the disc wheel is larger than a diameter of the flexible display panel wound around the roller,
wherein the disc wheel comprises:
an inner circle fixed to the roller;
a first outer circle which forms a step toward an outer side in a rotation shaft direction of the roller from a circumference of the inner circle; and
a second outer circle which faces the outer circle with respect to the inner circle, and which forms a step inward in the rotation shaft direction of the roller.

2. The display device of claim 1, wherein a diameter of the second outer circle is larger than a diameter of the first outer circle.

3. The display device of claim 2, wherein the second outer circle comprises a guide portion, the guide portion being a chamfered edge between a circumference of the second outer circle and a plane of the second outer circle facing the edges of the flexible display panel.

4. The display device of claim 1, further comprising:
a module cover which extends long in a length direction of the roller, and which has a plurality of segments sequentially arranged in an up-down direction of the flexible display panel at a rear surface of the flexible display panel,
wherein the flexible display panel and the module cover are configured to be wound around or unwound from the roller.

5. The display device of claim 1, wherein the flexible display panel descends to the ground while being unwound from the roller, and ascends from the ground while being wound around the roller.

6. A display device comprising:
a flexible display panel;
a roller which extends in a long direction, and around which the flexible display panel is wound, or from which the flexible display panel is unwound; and
a disc wheel which is located adjacent to edges of flexible display panel which is wound around the roller, which crosses a rotation shaft of the roller, and which is coupled to the roller,
wherein a diameter of the disc wheel is larger than a diameter of the flexible display panel wound around the roller, wherein the disc wheel is fixed to the roller and is configured to rotate with the roller, and wherein the display device further comprises a brake adjacent to the disc wheel, wherein the brake is arranged to brake a rotation of the disc wheel.

7. The display device of claim 6, further comprising:

a module cover which extends long in a length direction of the roller, and which has a plurality of segments sequentially arranged in an up-down direction of the flexible display panel at a rear surface of the flexible display panel, wherein the flexible display panel and the module cover are configured to be wound around or unwound from the roller.

8. The display device of claim 6, wherein the flexible display panel descends to the ground while being unwound from the roller, and ascends from the ground while being wound around the roller.

9. A display device comprising:

a flexible display panel;

a roller which extends in a long direction, and around which the flexible display panel is wound, or from which the flexible display panel is unwound; and a disc wheel which is located adjacent to edges of flexible display panel which is wound around the roller, which crosses a rotation shaft of the roller, and which is coupled to the roller, wherein a diameter of the disc wheel is larger than a diameter of the flexible display panel wound around the roller, further comprising:

a driving gear fixed to a plane of a first outer circle of the disc wheel;

an intermediate gear configured to mesh with the driving gear; and a motor gear configured to mesh with the intermediate gear.

10. The display device of claim 9, wherein the driving gear is an inner wheel gear, wherein the intermediate gear comprises:

an outer gear configured to mesh with the motor gear; and an inner gear configured to mesh with the driving gear.

11. The display device of claim 10, further comprising:

a motor configured to rotate the motor gear;

a sensor plate which is fixed to a rotation shaft of the motor gear, and which has a plurality of protrusions sequentially disposed along a circumferential direction; and a sensor which is located adjacent to the sensor plate, and which is configured to detect a rotation of the sensor plate.

12. The display device of claim 11, further comprising:

a first pipe which extends long in a length direction of the roller, and which is located adjacent to the roller; and a second pipe which extends long in the length direction of the roller, which is located adjacent to the roller, and which faces the first pipe with respect to the roller.

13. The display device of claim 12, further comprising:

a first frame which is located adjacent to one end of the roller; and a second frame which is located adjacent to the other end of the roller, and which faces the first frame with respect to the roller, wherein the first pipe and the second pipe are inserted to penetrate the first frame, wherein the first pipe and the second pipe are inserted to penetrate the second frame, wherein the motor is fixed to the first frame, wherein the sensor is fixed to a rib protruding from an inner side of the first frame.

14. The display device of claim 9, further comprising:

a module cover which extends long in a length direction of the roller, and which has a plurality of segments sequentially arranged in an up-down direction of the flexible display panel at a rear surface of the flexible display panel, wherein the flexible display panel and the module cover are configured to be wound around or unwound from the roller.

15. The display device of claim 9, wherein the flexible display panel descends to the ground while being unwound from the roller, and ascends from the ground while being wound around the roller.

* * * * *